United States Patent
Tanaka

(10) Patent No.: US 9,436,979 B2
(45) Date of Patent: Sep. 6, 2016

(54) IMAGE PROCESSING DEVICE, IMAGING DEVICE, IMAGE PROCESSING METHOD, AND NON-TRANSITORY COMPUTER READABLE MEDIUM

(71) Applicant: FUJIFILM Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/831,610

(22) Filed: Aug. 20, 2015

(65) Prior Publication Data

US 2015/0356713 A1 Dec. 10, 2015

Related U.S. Application Data

(63) Continuation of application No. 14/535,368, filed on Nov. 7, 2014, now Pat. No. 9,148,587, which is a continuation of application No. PCT/JP2013/064184, filed on May 22, 2013.

(30) Foreign Application Priority Data

May 28, 2012 (JP) ................................ 2012-121174

(51) Int. Cl.
*G06T 5/50* (2006.01)
*G06T 5/00* (2006.01)
(Continued)

(52) U.S. Cl.
CPC ............... *G06T 5/002* (2013.01); *G06T 5/004* (2013.01); *G06T 5/50* (2013.01); *H04N 5/217* (2013.01);
(Continued)

(58) Field of Classification Search
CPC ............ G06T 2207/1004; G06T 2207/20221; G06T 5/002; G06T 5/50
See application file for complete search history.

(56) References Cited

U.S. PATENT DOCUMENTS

2003/0215153 A1* 11/2003 Gindele ................... G06K 9/40
382/254
2008/0259176 A1* 10/2008 Tamaru .................. G03B 13/32
348/222.1
(Continued)

FOREIGN PATENT DOCUMENTS

JP 2005-051379 A 2/2005
JP 2007-241424 A 9/2007
(Continued)

OTHER PUBLICATIONS

International Search Report issued in PCT/JP2013/064184, mailed on Jun. 18, 2013.
(Continued)

*Primary Examiner* — Amy Hsu
(74) *Attorney, Agent, or Firm* — Birch, Stewart, Kolasch & Birch, LLP

(57) ABSTRACT

A device includes: an image acquisition device acquiring a taken image in which a subject is imaged; a smoothing device generating a smoothed image by smoothing the taken image; a noise extraction device extracting a difference noise component from a difference between the taken image and the smoothed image; a noise addition device adding the difference noise component to the smoothed taken image; a map acquisition device acquiring a blurring strength map that represents a distribution of blurring strengths for the taken image; and an image combining device combining the taken image with the smoothed image on the basis of the blurring strength map, and generating an output image.

4 Claims, 19 Drawing Sheets

(51) Int. Cl.
*H04N 5/217* (2011.01)
*H04N 5/232* (2006.01)
*H04N 5/235* (2006.01)
*H04N 5/262* (2006.01)
*H04N 5/272* (2006.01)

(52) U.S. Cl.
CPC ........ *H04N 5/2356* (2013.01); *H04N 5/23229* (2013.01); *H04N 5/2621* (2013.01); *H04N 5/2628* (2013.01); *H04N 5/272* (2013.01); *G06T 2207/10004* (2013.01); *G06T 2207/20182* (2013.01); *G06T 2207/20221* (2013.01)

(56) References Cited

U.S. PATENT DOCUMENTS

| 2011/0037877 | A1* | 2/2011 | Tamaru | H04N 5/23229 348/239 |
|---|---|---|---|---|
| 2011/0141229 | A1* | 6/2011 | Stec | H04N 5/232 348/37 |
| 2012/0200747 | A1* | 8/2012 | Higuchi | G06T 5/002 348/241 |
| 2013/0058591 | A1* | 3/2013 | Nishiyama | H04N 5/217 382/264 |
| 2013/0202165 | A1* | 8/2013 | Wehnes | G06T 7/0012 382/128 |

FOREIGN PATENT DOCUMENTS

| JP | 2008-271240 A | 11/2008 |
|---|---|---|
| JP | 2011-041089 A | 2/2011 |

OTHER PUBLICATIONS

Notice of Allowance dated May 27, 2015, issued in U.S. Appl. No. 14/535,368.

Written Opinion issued in PCT/JP2013/064184, mailed on Jun. 18, 2013.

* cited by examiner

IMAGE PROCESSING DEVICE, IMAGING DEVICE, IMAGE PROCESSING METHOD, AND NON-TRANSITORY COMPUTER READABLE MEDIUM

CROSS-REFERENCE TO RELATED APPLICATIONS

This application is a Continuation of copending application Ser. No. 14/535,368, filed on Nov. 7, 2014, which was filed as a By-Pass Continuation of PCT International Application No. PCT/JP2013/064184 filed on May 22, 2013, which claims priority under 35 U.S.C. §119(a) to Japanese Patent Application No. 2012-121174 filed on May 28, 2012. Each of the above application(s) is hereby expressly incorporated by reference, in its entirety, into the present application.

FIELD OF THE INVENTION

The present invention relates to an image processing device, an imaging device and an image processing method, and a program, and particularly to a technique that creates a blurring-emphasized image.

BACKGROUND OF THE INVENTION

Description of the Related Art

In fields of imaging devices, such as digital cameras, and image processing devices, corresponding point detection and image transformation are performed for a taken image acquired by what is called focus bracket imaging, and blurring is added to the taken image on the basis the results, thereby creating an image with a shallow depth of field.

For instance, in PTL 1 (Japanese Patent Application Laid-Open No. 2008-271240), the filter characteristics of a Gaussian filter to be applied to a reference image are calculated on the basis of focus bracketed images, and the reference image is locally smoothed on the basis of the characteristics, thereby creating a blurring-emphasized image.

PTL 2 (Japanese Patent Application Laid-Open No. 2007-241424) discloses that when a noise adding filter is applied to an image, a region which includes a person or the like and to which noise is not intended to be added is detected, a soft focus process is performed for this region, and a noise adding process is applied to regions other than this region.

SUMMARY OF THE INVENTION

In the case where the conventional techniques as in the patent literatures perform a blurring process on an image, a typical technique using a smoothing filter or the like unfortunately generates an uncomfortable image where the difference between noise amounts in blurred parts and the other parts occurs to create unevenness. For instance, in the foregoing PTL 1, the difference between noise amounts in images that occur owing to the blurring process are not considered. In PTL 2, noise is added to a specific region. Noise decreases according to filter characteristics in a soft focus process in a region which includes a person or the like and to which no noise is intended to be added, while noise is added to the other regions. Accordingly, a difference in noise unfortunately occurs in processed images, thus causing a problem.

The present invention has been made in view of such situations, and has an object to provide an image processing device, an imaging device and an image processing method, and a program that can reduce the difference between noise amounts of a blurred part and the other parts, and create a natural blurring-emphasized image.

In order to achieve the objects, the present invention provides an image processing device, including: an image acquisition device acquiring a taken image in which a subject is imaged; smoothing device generating a smoothed image by smoothing the taken image; a noise extraction device extracting a difference noise component from a difference between the taken image and the smoothed image; a noise addition device adding the difference noise component to the smoothed image; a map acquisition device acquiring a blurring strength map that represents a distribution of blurring strengths for the taken image; and an image combining device combining the taken image with the smoothed image on the basis of the blurring strength map, and generating an output image. Here, the "difference noise component" represents noise reduced from the taken image, by smoothing the taken image. Furthermore, the "noise" is a component that is a disturbance (noise component) of the image and does not correlate with a subject image.

As described above, through smoothing the taken image, the smoothed image is generated; the difference noise component is extracted from the difference between the taken image and the smoothed image; the difference noise component is added to the smoothed image; the taken image and the smoothed image are combined with each other on the basis of the blurring strength map; and an output image is generated. Accordingly, the difference between the noise amounts of a blurred part and the other part can be reduced, and a more natural blurring-emphasized image where the local difference in noise amounts is inconspicuous can be acquired.

In one embodiment, the smoothing device generates a plurality of smoothed images with different smoothing strengths by smoothing the taken images with the respective different smoothing strengths; the noise extraction device extracts a plurality of difference noise components from respective differences between the taken image and the smoothed images; the noise addition device equalizes noise among the smoothed images by adding the corresponding difference noise component among the difference noise components to each of the smoothed images; and the image combining device combines the taken image with the smoothed images on the basis of the blurring strength map.

In one embodiment, the blurring strength map represents a distribution of the blurring strengths on a pixel-by-pixel basis or each pixel region in the taken image, and the image combining device generates the output image by selecting a plurality of images from among the taken image and smoothed images to which the difference noise components are added, on a pixel-by-pixel basis or a region-by-region basis in the taken image, and selecting a plurality of images from among the taken image and the smoothed images, on the basis of the blurring strength of the blurring strength map, and calculating a weighted average of the selected images.

In one embodiment, the smoothing device includes a thinning device reducing an image size by pixel thinning, and a magnification device enlarging the image size by pixel interpolation, generates the smoothed images with different smoothing strengths and image sizes by repeating, multiple times, smoothing with a same smoothing strength and pixel thinning by the thinning device, and converts the smoothed images by magnification device into the smoothed images with different smoothing strengths and the identical image size.

In one embodiment, the blurring strength map represents a distribution of the blurring strengths on a pixel-by-pixel basis or each pixel region in the taken image, and the smoothing device determines the smoothing strength of smoothing for the taken image on the basis of the maximum blurring strength in the blurring strength map.

Furthermore, the present invention provides an image processing device, including: an image acquisition device acquiring a taken image in which a subject is imaged; a noise image acquisition device acquiring a noise image that represents noise included in the taken image; a smoothing device generating a smoothed image by smoothing the taken image, and generating a smoothed noise image by smoothing the noise image with the smoothing strength used for smoothing the taken image; a noise extraction device extracting a difference noise component from a difference between the taken image and the smoothed noise image; a noise addition device adding the difference noise component to the smoothed image; a map acquisition device acquiring a blurring strength map that represents a distribution of blurring strengths for the taken image; and an image combining device combining the taken image with the smoothed image on the basis of the blurring strength map, and generating an output image. Here, the "difference noise component" represents noise reduced from the taken image, by smoothing the taken image.

Preferably, the noise image is an image that includes noise identical to the noise included in the taken image. Here, the "identical" to the noise included in the taken image encompasses substantially identical cases; the difference of widths of normal distributions (variance or standard deviation) is within 5% inclusive, the difference of noise strengths is within 10% inclusive or the like.

In one embodiment, the smoothing device generates a plurality of smoothed images with different smoothing strengths by smoothing the taken image with respective different smoothing strengths, and generates smoothed noise images with different smoothing strengths by smoothing the noise image with the respective different smoothing strengths used for smoothing the taken image; the noise extraction device extracts a plurality of difference noise components corresponding to the respective smoothed images from respective differences between the noise image and the smoothed noise images; the noise addition device equalizes noise among the smoothed images by adding the corresponding difference noise component among the difference noise components to each of the smoothed images; and the image combining device combines the taken image with the smoothed images on the basis of the blurring strength map, and generates an output image.

In one embodiment, the blurring strength map represents a distribution of the blurring strengths on a pixel-by-pixel basis or each pixel region in the taken image, and the image combining device generates the output image by selecting a plurality of images from among the taken image and the smoothed images to which the difference noise components are added, on a pixel-by-pixel basis or a region-by-region basis in the taken image, on the basis of the blurring strength of the blurring strength map, and calculating a weighted average of the selected images.

In one embodiment, the smoothing device includes a thinning device reducing an image size by pixel thinning, and a magnification device enlarging the image size by pixel interpolation, generates the smoothed images with different smoothing strengths and image sizes by repeating, multiple times, smoothing with a same smoothing strength and pixel thinning by the thinning device, and converts the smoothed images by the magnification device into the smoothed images with different smoothing strengths and an identical image size, and generates the smoothed noise images with different smoothing strengths and image sizes by repeating, multiple times, smoothing with a same smoothing strength and pixel thinning by the thinning device, and converts the smoothed noise images by a magnification device into the smoothed noise images with different smoothing strengths and an identical image size.

In one embodiment, the blurring strength map represents a distribution of the blurring strengths on a pixel-by-pixel basis or each region in the taken image, and the smoothing device determines the smoothing strength of smoothing for the taken image and the noise image on the basis of the maximum blurring strength in the blurring strength map.

In one embodiment, the smoothing device causes the noise image and the taken image to have an identical smoothing strength.

In one embodiment, the noise image acquisition device generates the noise image on the basis of the taken image.

In one embodiment, the noise image acquisition device generates the noise image on the basis of an imaging condition of the taken image or imaging characteristics of an imaging device with which the taken image is acquired.

In one embodiment, the map acquisition device acquires, as the blurring strength map, a distance map that represents a distribution of distances on a pixel-by-pixel basis or a region-by-region basis in the taken image, and the image combining device generates the output image having a distribution of blurring strengths according to a distribution of distances in the taken image on the basis of the distance map.

Furthermore, the present invention provides an imaging device including the image processing device.

Moreover, the present invention provides an image processing method, using an image acquisition device acquiring a taken image in which a subject is imaged, and a map acquisition device acquiring a blurring strength map that represents a distribution of blurring strengths for the taken image, and including; a smoothing step of generating a smoothed image by smoothing the taken image; a noise extraction step of extracting a difference noise component from a difference between the taken image and the smoothed image; a noise addition step of adding the difference noise component to the smoothed image; and an image combining step of combining the taken image with the smoothed image on the basis of the blurring strength map, and generating an output image.

Furthermore, the present invention provides an image processing method, using an image acquisition device acquiring an taken image in which a subject is imaged, a noise image acquisition device acquiring a noise image that represents noise included in the taken image, and a map acquisition device acquiring a blurring strength map that represents a distribution of blurring strengths for the taken image, and including: a step of generating a smoothed image by smoothing the taken image; a step of generating a smoothed noise image by smoothing the noise image with the smoothing strength used for smoothing the taken image; a noise extraction step of extracting a difference noise component from a difference between the noise image and the smoothed noise image; a noise addition step of adding the difference noise component to the smoothed image; and an image combining step of combining the taken image with the smoothed image on the basis of the blurring strength map, and generating an output image.

Moreover, the present invention provides a program using an image acquisition device acquiring an taken image in which a subject is imaged, and a map acquisition device acquiring a blurring strength map that represents a distribution of blurring strengths for the taken image, and causing a computer to execute: a smoothing step of generating a smoothed image by smoothing the taken image; a noise extraction step of extracting a difference noise component from a difference between the taken image and the smoothed image; a noise addition step of adding the difference noise component to the smoothed image; and an image combining step of combining the taken image with the smoothed image on the basis of the blurring strength map, and generating an output image.

Furthermore, the present invention provides a program using an image acquisition device acquiring an taken image in which a subject is imaged, a noise image acquisition device acquiring a noise image that represents noise included in the taken image, and a map acquisition device acquiring a blurring strength map that represents a distribution of blurring strengths for the taken image, and causing a computer to execute: a step of generating a smoothed image by smoothing the taken image; a step of generating a smoothed noise image by smoothing the noise image with the smoothing strength used for smoothing the taken image; a noise extraction step of extracting a difference noise component from a difference between the noise image and the smoothed noise image; a noise addition step of adding the difference noise component to the smoothed image; and an image combining step of combining the taken image with the smoothed image on the basis of the blurring strength map, and generating an output image.

The present invention can reduce the difference between noise amounts of a blurred part and the other parts, and create a natural blurring-emphasized image.

DETAILED DESCRIPTION OF THE PREFERRED EMBODIMENTS

Embodiments for implementing an image processing device and method and program according to the present invention are hereinafter described in detail with reference to the accompanying diagrams.

[Configuration of Imaging Device]

Figure 1:
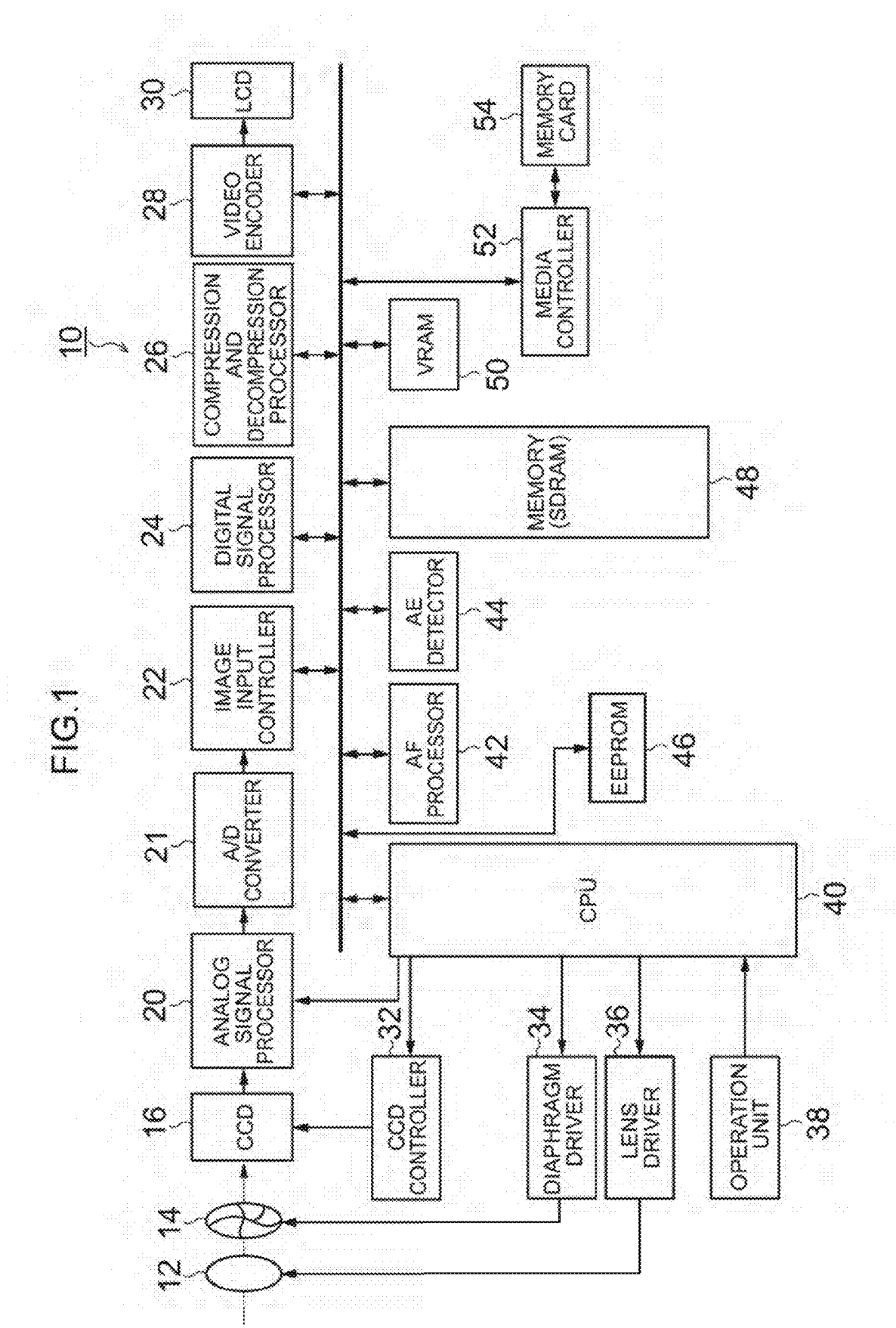
FIG. 1 is a block diagram showing an example of a configuration of an imaging device to which an image processing device according to the present invention is applied.

FIG. 1 is a block diagram showing an example of a configuration of an imaging device 10 to which an image processing device according to the present invention is applied. The operation of the entire imaging device 10 is integrally controlled by a central processing unit (CPU) 40. A program (including a program used for an imaging process described later) and parameters that are required for the operation of the CPU 40 are stored in a non-temporary storing medium, such as EEPROM (Electronically Erasable and Programmable Read Only Memory) 46.

The imaging device 10 is provided with an operation unit 38, such as a shutter release button, a mode dial, a playback button, a MENU/OK key, an arrow key, and a BACK key. A signal from the operation unit 38 is input into the CPU 40. As described later, the CPU 40 controls each circuit in the imaging device 10 on the basis of the input signal.

The shutter release button is an operation button through which an instruction for starting imaging is input, and includes a two-step stroke switch that has an S1 switch that is turned on when halfway pressed, and an S2 switch that is turned on when fully pressed. The mode dial is device selecting a still/moving imaging mode, a manual/auto imaging mode, and an imaging scene and the like. Furthermore, imaging sensitivity (e.g., ISO100, 400, 800, 1600, etc.) can be set.

The playback button is a button for switching a mode to a playback mode for displaying, on a liquid crystal monitor (LCD) 30, a still image or a moving image which has been taken and recorded. The MENU/OK key has both a function for issuing an instruction for displaying a menu on a screen of the liquid crystal monitor 30 and a function of issuing an instruction for determining and executing selection details. The arrow key is an operation unit for receiving an instruction in four directions, which are vertical and horizontal directions, and functions as a cursor movement operation device, a zoom switch, a frame advance button in a playback mode and the like. The BACK key is used for deleting a desired object, such as a selected item, canceling instructed details, or going back to a one-step previous operation state. These buttons and keys can be used also for operations required for the blurring process and the noise adding process in such a case where a user designates the degree of the blurring process.

In an imaging mode, image light representing a subject is image-formed on a light receiving surface of an image pickup element (in this example, a CCD sensor is used, and the element is hereinafter referred to as "CCD") 16 via an imaging lens 12 and a diaphragm 14. Note that the image pickup element is not limited to the CCD sensor. Alternatively, another image pickup sensor, such as a MOS sensor, may be used.

The imaging lens 12 includes a focusing lens and a zoom lens, is driven by a lens driver 36 controlled by the CPU 40, and subjected to focus control, zoom control and the like.

The lens driver 36 moves the focusing lens in the optical axis direction according to an instruction from the CPU 40 to change a focus position. The lens driver 36 moves forward and backward the zoom lens in the optical axis direction according to an instruction from the CPU 40 to change the focal length.

The CPU 40 controls the diaphragm 14 through a diaphragm driver 34, controls charge storage time (shutter speed) in the CCD 16 through a CCD controller 32, and performs control for reading an image signal from the CCD 16. The signal charge stored in the CCD 16 is read as a voltage signal according to the signal charge on the basis of a reading signal applied by the CCD controller 32, and applied to the analog signal processor 20.

The analog signal processor 20 sample-holds R, G and B signals from each pixel for voltage signals output from the CCD 16 according to a correlated double sampling process, amplifies the signals and subsequently adds the signals to an A/D converter 21. The A/D converter 21 converts sequentially received analog R, G and B signals into digital R, G and B signals, and outputs the signals to an image input controller 22.

The digital signal processor 24 applies predetermined signal processing, such as a gain control process, a Gamma correction process, and YC processing, including an offset process, white balance correction and sensitivity correction, to the digital image signal input via the image input controller 22.

The image data processed by the digital signal processor 24 is input into a VRAM 50. The VRAM 50 includes an A region and a B region each of which stores image data representing one frame of an image. The image data representing one frame of an image is alternately rewritten between the A region and the B region. The written image data is read from a region other than a region in which the image data is being rewritten. The image data read from the VRAM 50 is encoded by the video encoder 28, and output to the liquid crystal monitor 30, thereby allowing a subject image to be displayed on the liquid crystal monitor 30.

Upon first stage pressing (half pressing) of the shutter release button of the operation unit 38, the CPU 40 starts an AF operation and an AE operation, and performs auto-focus control for the imaging lens 12 via the lens driver 36. Image data output from the A/D converter 21 upon half pressing of the shutter release button is captured into an AE detector 44.

The CPU 40 calculates the brightness of a subject (imaging Ev value) from the integrated value of the G signal input from the AE detector 44, determines an aperture value of the diaphragm 14 and an electronic shutter (shutter speed) of the CCD 16 on the basis of the imaging Ev value, and controls the diaphragm 14 and charge storage time in the CCD 16 on the basis of the result.

The AF processor 42 is a section for performing a contrast AF process and a phase AF process. In the case of performing the contrast AF process, the focusing lens in the imaging lens 12 is controlled so as to maximize an AF evaluation value that has been calculated by integrating a high frequency component of the image data in a predetermined focus region and represents a focus state. In the case of performing a phase difference AF process, the focusing lens in the imaging lens 12 is controlled such that the defocus amount acquired from the phase difference between the pieces of image data of a main pixel and a sub-pixel in the predetermined focus region in the image data becomes zero.

When the AE operation and the AF operation are finished and then second stage pressing (full pressing) of the shutter release button is preformed, the image data output from the A/D converter 21 is input from the image input controller 22 into a memory (SDRAM) 48 in response to the pressing, and temporarily stored therein.

After the data is temporarily stored in the memory 48, an image file is generated through signal processing, such as YC processing, in the digital signal processor 24 and a compression process and the like in a compression and decompression processor 26 into the JPEG (Joint Photographic Experts Group) format and the like. The image file is read by a media controller 52 and recorded in a memory card 54. The image recorded in the memory card 54 can be played back and displayed on the liquid crystal monitor 30 through an operation on the playback button of the operation unit 38.

[Flow of Entire Image Processing in Imaging Device]

Next, the entire flow of an example of image processing according to the present invention is described.

Figure 2:
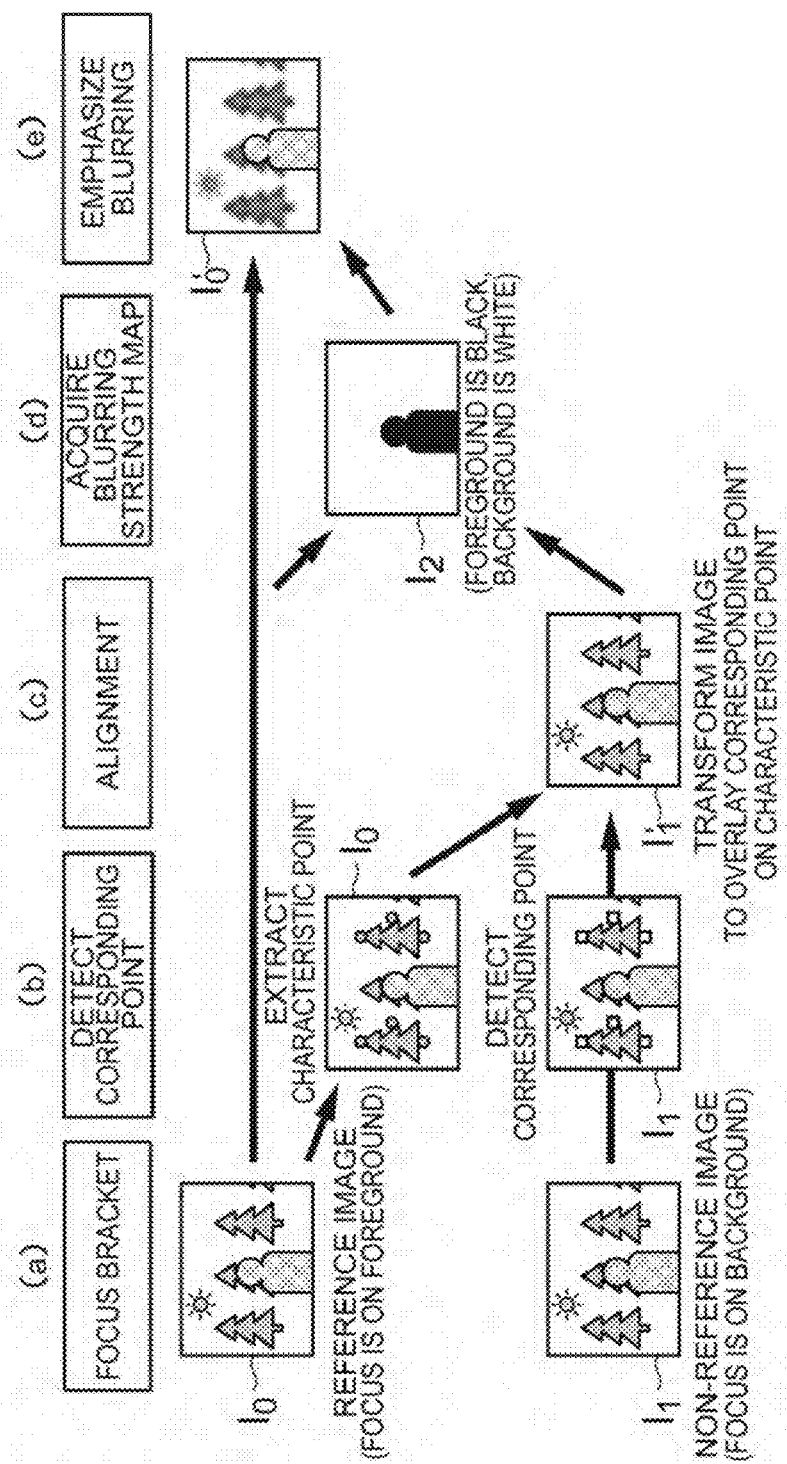
FIG. 2 is a schematic diagram schematically showing an overview of an example of image processing according to the present invention.
Figure 3:
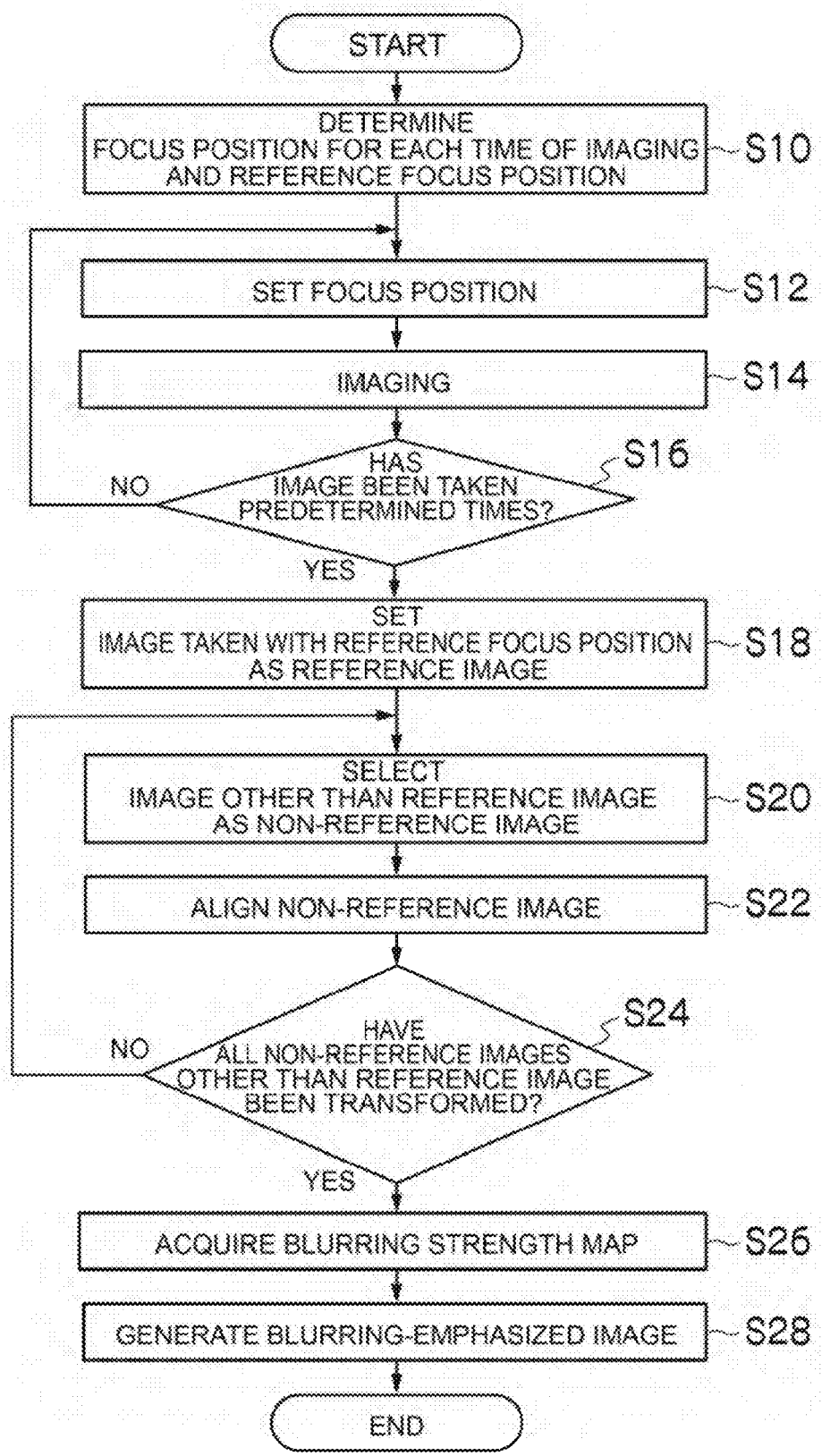
FIG. 3 is a flowchart showing a flow of an example of the image processing in FIG. 2.

FIG. 2 is a schematic diagram schematically showing an overview of an example of image processing according to the present invention. FIG. 3 is a flowchart showing the entire flow of an example of the image processing in FIG. 2.

As shown in FIGS. 2 and 3, the image processing in this example is roughly divided into five stages that include (1) focus bracket imaging ((a) portion of FIG. 2; steps S10 to S16 of FIG. 3), (2) corresponding point detection and alignment ((b) and (c) portions of FIG. 2; steps S18 to S24 of FIG. 3), (3) blurring strength map acquisition ((d) portion of FIG. 2; step S26 in FIG. 3), and (4) blurring emphasis ((e) portion of FIG. 2; step S28 of FIG. 3). Processes in the respective stages are hereinafter described.

Here, as with the example in FIG. 2, the case where a person stands before the background and a blurring process is applied to the background is considered.

(1) Focus Bracket Imaging

When the process is started, in step S10 a focus position for each of predetermined times of imaging included in focus bracket imaging and a reference focus position are determined. In S12, the CPU 40 moves the lens 12 to focus on a first focus position. In step S14, an image is taken. If the number of times of imaging does not reach the predetermined number of times (no in S16), the processing returns to S12 and the lens 12 is moved to focus on the next focus position and then repeats imaging. If the number of times of imaging reaches the predetermined number of times (yes in S16), the processing proceeds to S18.

(2) Corresponding Point Detection and Alignment

First, in S18, an image taken at the reference focus position among a plurality of images acquired by focus bracket imaging (steps S10 to S16) is set as a reference image $I_0$. Next, in step S20, an image other than the reference image $I_0$ is selected as a non-reference image $I_1$. Next, in step S22, a feature point in the reference image $I_0$ is extracted, a corresponding point in the non-reference image $I_1$ that corresponds to the feature point of the reference image $I_0$ is detected, and alignment is performed such that the position of the corresponding point of the non-reference image $I_1$ match with the position of the feature point of the reference image $I_0$ (step S22). Such alignment is performed because there may be a case where imaging timing at each time of imaging of focus bracketing is slightly different and the angle of view deviates. The alignment is performed by transforming the non-reference image $I_1$ to create a transformed image $I_1'$ such that the feature point is overlaid on the corresponding point. The processes in steps S20 to S22 are performed for all the non-reference images $I_1$ (during no in step S24).

(3) Blurring Strength Map Acquisition

After alignment is completed (yes in step S24), the processing proceeds to step S26 and a blurring strength map $I_2$ is generated (acquired) from the reference image $I_0$ and the transformed image $I_1'$. The blurring strength map (the distance image in this example) represents a distribution of blurring strengths in a blurring-emphasizing process described later with respect to the reference image. In the schematic diagram of the (d) portion of FIG. 2, the blurring strength map $I_2$ is represented in two colors, i.e., black (foreground) and white (background). However, the blurring strength map $I_2$ is not necessarily limited to a binary image.

(3) Blurring-Emphasizing Process

In step S28, a blurring process is applied to the reference image $I_0$ on the basis of information on the distribution of blurring strengths included in the blurring strength map $I_2$ created in the processes up to step S26. Various filters are usable for the blurring process. For instance, a Gaussian filter represented by the following Expression 1 is used.

$$f(x) = (2\pi\sigma^2)^{-1/2} \times \exp(-x^2/(2\sigma^2))$$ [Expression 1]

In the above expression, σ represents a blurring-emphasized degree due to the blurring-emphasizing process. The lower the σ is, the lower the blurring-emphasized degree is. The higher the σ is, the higher the blurring-emphasized degree is. Various sizes of kernels, i.e., 3×3, 5×5, etc. can be used for applying the Gaussian filter. Such a Gaussian filter is applied, and the blurring process is applied to the reference image $I_0$ on the basis of the blurring strength map to thereby generate a blurred image $I_0'$. For instance, on a pixel with a small distance, σ of the Gaussian filter is set small, thereby allowing the blurring-emphasized degree to be low. On a pixel with a large distance, σ is set large, thereby allowing the blurring-emphasized degree to be high.

If only the blurring process is performed in the blurring-emphasizing process in step S28, a background region of the reference image $I_0$ is blurred according to the filter characteristics (the strength of a of the Gaussian filter in the foregoing example) used for the blurring process. According to the blurring process, noise included in the original reference image $I_0$ is reduced in the background region. In contrast, noise in a region including a person to which no blurring process is applied (or with a weak degree of the blurring process) is not reduced. That is, if only the blurring process is performed, a difference in noise amount between the background region to which the blurring process is applied and the region including the person to which the blurring process is not applied occurs, for instance. To address this, the image processing according to the present invention extracts noise and applies noise in the blurring-emphasizing process in order to reduce the difference in noise between the region to which the blurring process (smoothing) is applied and the region to which the blurring process is not applied.

[Exemplary Embodiment of Blurring-Emphasizing Process]

Next, an exemplary embodiment of the blurring-emphasizing process (step S28 in FIG. 3) is described.

First Exemplary Embodiment

Figure 4:
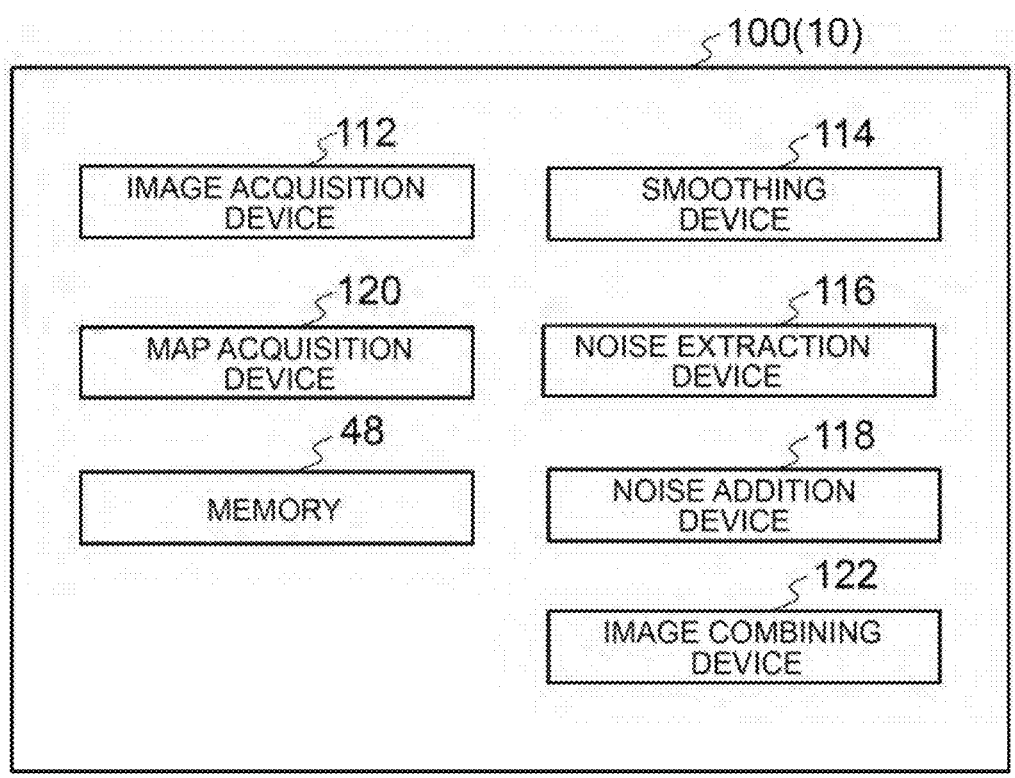
FIG. 4 is a block diagram showing a configuration of an image processing device of a first exemplary embodiment.

FIG. 4 is a block diagram showing a configuration of an image processing device of a first exemplary embodiment. Hereinafter, an example of an image processing device 100 in FIG. 4 in the imaging device 10 in FIG. 1 to which the present invention is applied is described.

In FIG. 4, the image processing device 100 includes an image acquisition device 112 for acquiring a taken image in which a subject has been imaged, a smoothing device 114 for generating a smoothed image by uniformly smoothing the entire taken image acquired by the image acquisition device 112, a noise extraction device 116 for extracting a difference noise component from a difference (hereinafter, also referred to as a "difference image") between the taken image and the smoothed image, a noise addition device 118 for equalizing noise between the smoothed image and the taken image acquired by the image acquisition device 112, by adding a difference noise component to the smoothed image, a map acquisition device 120 for acquiring a blurring strength map, and an image combining device 122 for generating an output image (blurring-emphasized image) of a distribution of blurring strengths according to the blurring strength map by combining the taken image with the smoothed image on the basis of the blurring strength map.

The smoothing device 114 in this example generates a plurality of smoothed images with smoothing strengths different from each other by smoothing the taken image (input image) acquired by the image acquisition device 112 with the different smoothing strengths.

The noise extraction device 116 of this example generates a plurality of difference images that represent differences between the taken image (input image) and the smoothed images, and extracts a plurality of difference noise components (difference noise images) that correspond to the respective smoothed images from the difference images. The "difference noise component" in this example includes a difference between noise included in the taken image and noise included in the smoothed image, and represents noise reduced from the taken image by smoothing the taken image. Note that the "noise" is a disturbance of an image (noise component), and a component that does not correlated with the subject image.

The noise addition device 118 in this example equalizes noise of the smoothed images by adding the corresponding difference noise component among the difference noise components to each of the smoothed images.

The image combining device 122 in this example generates an output image (blurring-emphasized image) of the distribution of blurring strengths according to the blurring strength map by combining the taken image with the smoothed images on the basis of the blurring strength map.

The image acquisition device 112 has a configuration that includes, for instance, the CCD 16 (image pickup element) and the image input controller 22 in FIG. 1. The image acquisition device 112 may be configured by the media controller 52 in FIG. 1, and the taken image may be input from the memory card 54. The map acquisition device 120 is configured by, for instance, the CPU 40 in FIG. 1, and the blurring strength map is acquired by causing the CPU 40 to generate the blurring strength map. The map acquisition device 120 may be configured by the media controller 52 in FIG. 1, and the blurring strength map may be acquired from the memory card 54. The smoothing device 114, the noise extraction device 116, the noise addition device 118 and the image combining device 122 are configured by, for instance, the CPU 40 in FIG. 1.

Smoothing for an input image by the smoothing device 114 may be performed in one stage (generating one smoothed image) in principle. That is, if the original taken image (input image) and one smoothed image are provided, the output image (blurring-emphasized image) that corresponds to the purposed distribution of blurring strengths represented in the blurring strength map can be generated by combining images. However, in the standpoint of the image quality of the output image, at least two stages (generating at least two smoothed images with different smoothing strengths) are desirable.

Figure 5:
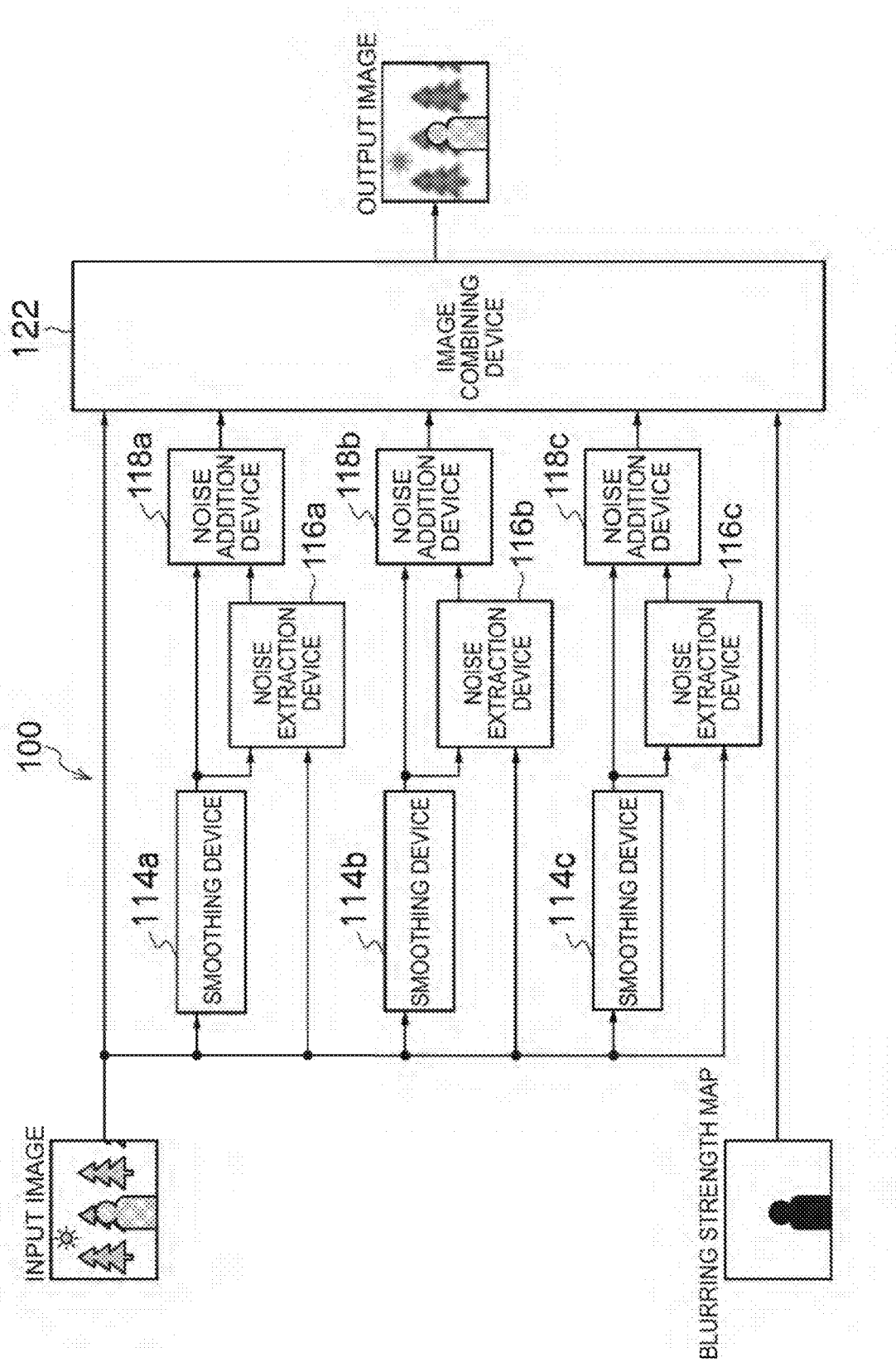
FIG. 5 is a block diagram showing a configuration of a main part of the image processing device in the case of performing multi-stage smoothing in the first exemplary embodiment.

FIG. 5 is a block diagram showing a main part of an example of the image processing device 100 in the case of performing multi-stage smoothing. In order to facilitate understanding of multi-stage smoothing. FIG. 5 shows the case where the image processing device 100 includes smoothing devices 114a, 114b and 114c, noise extraction devices 116a, 116b and 116c, and noise addition devices 118a, 118b and 118 c. The smoothing strengths of the smoothing devices 114a, 114b and 114c are different from each other. The first smoothing device 114a generates a first smoothed image by smoothing the entire input image with a first smoothing strength. The second smoothing device 114b generates a second smoothed image by smoothing the entire input image with a second smoothing strength. The third smoothing device 114c generates a third smoothed image by smoothing the entire input image with a third smoothing strength.

That is, the first smoothed image input into the first noise extraction device 116a and the first noise addition device 118a, the second smoothed image input into the second noise extraction device 116b and the second noise addition device 118b, and the third smoothed image input into the third noise extraction device 116c and the third noise addition device 118c have blurring strengths (smoothing strengths) different from each other. Accordingly, a first blurred image output from the first noise addition device 118a and a second blurred image output from the second noise addition device 118b, and a third blurred image output from the third noise addition device 118c have blurring strengths (smoothing strengths) different from each other.

Figure 6:
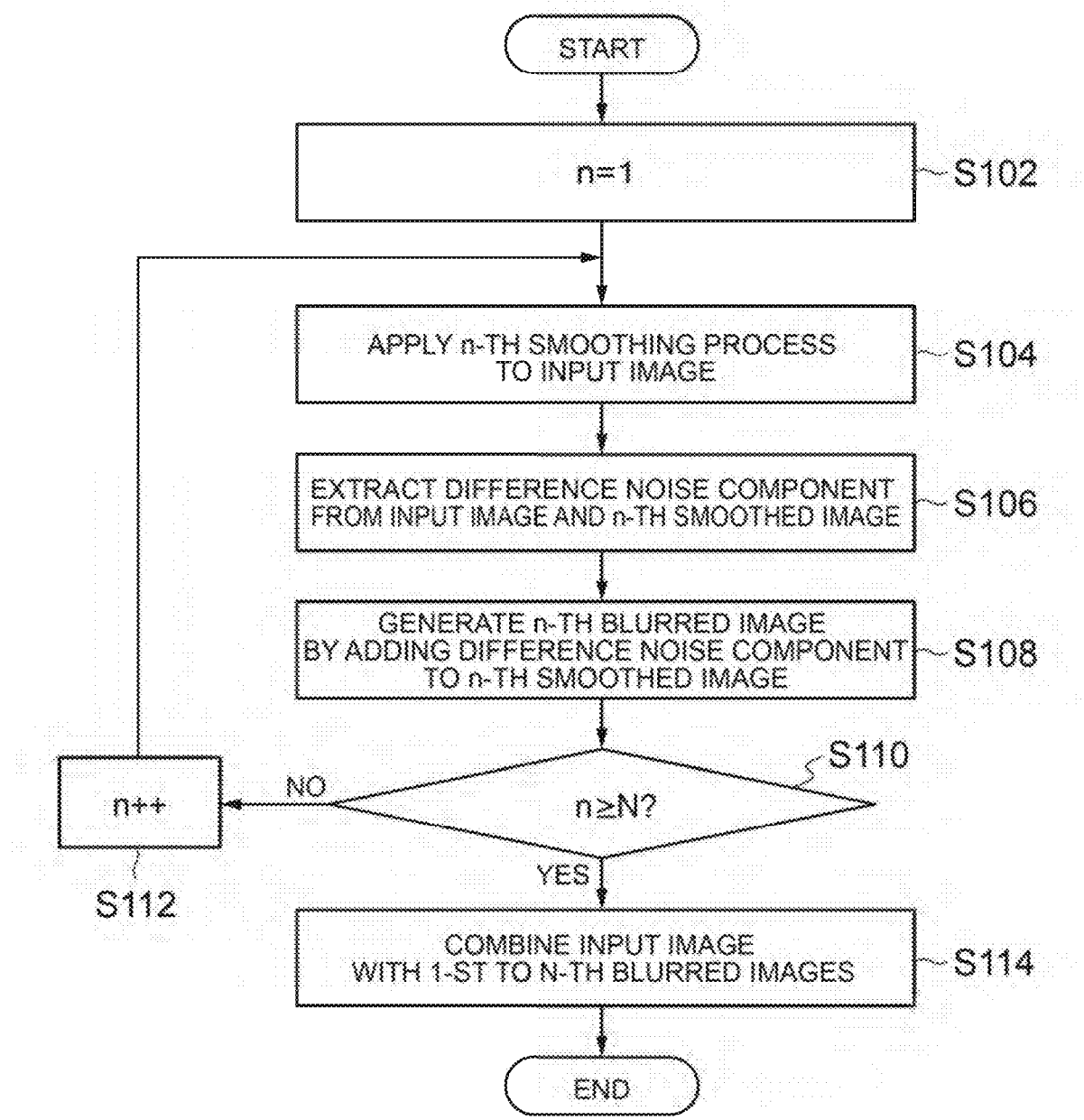
FIG. 6 is a flowchart showing a flow of an example of a blurring-emphasizing process in the first exemplary embodiment.

FIG. 6 is a flowchart showing a flow of an example of a blurring-emphasizing process in the image processing device 100 in FIG. 4. This process is executed by the CPU 40 in FIG. 1 according to a program.

Note that the input image (original taken image) has been acquired by the image acquisition device 112, and the blurring strength map has been acquired by the map acquisition device 120. Note that as the blurring strength map, for instance, a distance map that represents the distribution of distances in the taken image on a pixel-by-pixel basis or a region-by-region basis is acquired.

First, a variable n that represents the smoothing stage number is initially set to one (step S102).

Next, the smoothing device 114 applies the n-th smoothing process to the input image (original taken image) that is to be a target of blurring emphasis (step S104: smoothing step). That is, the smoothing device 114 generates the n-th smoothed image by uniformly smoothing the entire taken image with the n-th smoothing strength. For instance, a Gaussian filter is used for the smoothing process. The smoothing device 114 can uniformly smooth the entire taken image with each of smoothing strengths $\sigma 1$, $\sigma 2$ and $\sigma 3$ ($\sigma 1 < \sigma 2 < \sigma 3$) that are different from each other.

Next, the noise extraction device 116 extracts the n-th difference noise component corresponding to the n-th smoothed image by generating the difference (difference image) between the input image (original taken image) and the n-th smoothed image and extracting a difference noise component from the difference image (step S106: noise extraction step). Thus, a noise component (referred to as a "difference noise component") reduced from that of the taken image by smoothing with the n-th smoothing strength is extracted as a difference noise image.

Note that the difference image between the input image and the smoothed image includes a true signal that represents a subject image other than the noise component in actuality. Accordingly, it is preferable to extract only the noise component by excluding components other than the noise component from the difference image, instead of adopting the difference image itself as the difference noise component. More specifically, first, edge detection is performed and an edge component is removed; second, the amplitude (pixel value) of a signal component included in the image is compared with a threshold, and signal components having a larger amplitude than the threshold is removed and so on. Extraction of such a preferable noise component is described later. Note that there is a case where not all components other than the noise component can be removed from the difference image. That is, there is a case where the "difference noise component" in the present invention includes a true signal correlated to the subject image. Furthermore, there is a case where not the entire difference between the noise of the input image and the noise of the smoothed image can be extracted from the difference image. That is, there is a case where the "difference noise component" in the present invention includes only a part of the difference between the noise of the input image and the noise of the smoothed image.

Next, the noise addition device 118 generates the n-th blurred image by adding the n-th difference noise component to the n-th smoothed image (step S108: noise addition step). Thus, the noise (difference noise component) reduced from the taken image by smoothing with the n-th smoothing strength is added to the taken image to restore the image. That is, a blurred image where signal components other than the noise component among the signal components of the input image are smoothed (a blurred image where the noise component is not smoothed) is generated.

Next, it is determined whether the variable n reaches the number of repetition times N (N is the number of steps) or not (step S110).

If n<N, the variable n is incremented (addition of "1") (step S112), and the processing returns to step S104.

If n≥N (if n reaches N), the image combining device 122 generates an output image with a distribution of blurring strengths according to the blurring strength map by combining the input image (original taken image) with the first to N-th blurred images (smoothed images to which the difference noise image is added) on the basis of the blurring strength map (step S114: image combining step).

The image combining device 122 acquires a blurring strength (smoothing strength) in units of pixels of the input image by referring to the blurring strength map. For instance, two images are selected from among the input image and the first to N-th blurred images, and smoothing strengths σa and σb (referred to as "multi-stage smoothing strength") of these selected two images (e.g., the blurred image a and the blurred image b) are used to represent the smoothing strength σ (referred to as "purposed smoothing strength") of a significant pixel p0(x, y) of the input image by the following expression.

$$\sigma = w \times \sigma a + (1-w) \times \sigma b \ (\sigma a \le \sigma \le \sigma b),$$ [Expression 2]

where w is a weighting coefficient. In this example, it is assumed that the input image is smoothed with the smoothing strength "σ0", and two smoothing strengths σa and αb are selected from among σ0, σ1, σ2 and σ3. As described above, it is assumed that a condition of σa≤σ≤σb is satisfied; if σ>σ3 as an exception, measures are taken such that σa=σb=σ3, for instance.

The amount of blurring (blurring strength) substantially equivalent to that in the case of smoothing with a purposed smoothing strength σ is achieved by calculating the weighted average w that satisfies Expression 2 and calculating the weighted average of pixel values as with the following Expression 3.

$$c(x,y) = w \times a(x,y) + (1-w) \times b(x,y)$$ [Expression 3]

Thus, combination of multiple images (the input image and multiple blurred images in this example) with different smoothing strengths can generate a purposed blurring-emphasized image. Furthermore, use of a group of smoothed images to which noise components lost in smoothing are added can generate a blurring-emphasized image having an indistinct local noise characteristic difference.

In the case of using the distance map, such as the distance image, as blurring strength map, the image combining device 122 generates an output image (blurring-emphasized image) having a distribution of blurring strengths according to the distribution of distances in the taken image on the basis of the distance map.

Next, working effects in the case of performing the smoothing process in multiple stages as shown in FIGS. 5 and 6 are described. If one frame of an input image and one frame of a smoothed image are provided, the present invention can generate an image having an intermediate smoothing strength between the strengths of both of the images by combining both the images in principle. However, in view of image quality, it is preferable to generate at least two frames of the smoothed image with different smoothing strengths and combine the images. The reason thereof is described below.

Figure 7:
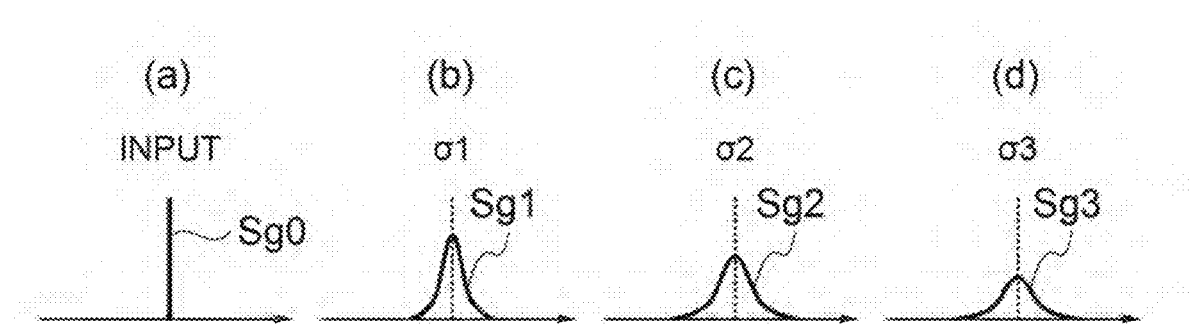
FIG. 7 is an illustration diagram for illustrating working effects of performing a smoothing process in multiple stages.
Figure 8:
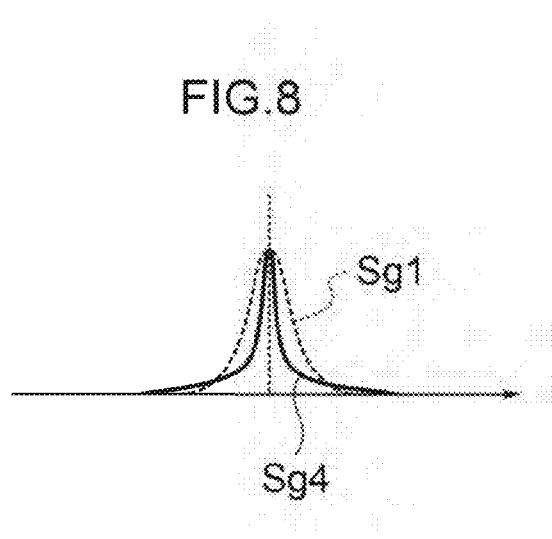
FIG. 8 is an illustration diagram for illustrating working effects of performing the smoothing process in multiple stages.

FIG. 7 shows a result of application of Gaussian filters having different strengths to a signal of a delta function. The (a) portion of FIG. 7 shows an input signal Sg0 of the delta function. The (b) portion of FIG. 7 shows an output signal (smoothed signal Sg1) in the case of smoothing with a strength σ1. The (c) portion of FIG. 7 is an output signal (smoothed signal Sg2) in the case of smoothing with a strength σ2. The (d) portion of FIG. 7 is an output signal (smoothed signal Sg3) in the case of smoothing with a strength σ3. Here, σ1<σ2<σ3. As shown in the portions (a) to (d) of FIG. 7, the higher the smoothing strengths are, the lower the amplitudes of the output signals (Sg1 to Sg3) tend to decrease, thereby spreading toward the bottom. Meanwhile, FIG. 8 shows a combination where the peak of a combined signal Sg4 in which the input signal Sg0 and the smoothed signal Sg3 are combined becomes the peak of the smoothed signal Sg1. As shown in this diagram, although the peaks (the signal intensities of the peak positions) match with each other, the spreads of the signals are different from each other. This technique is an approximation method of generating a desired smoothed signal by combining smoothed signals having different smoothing strengths. A result of combination shown in FIG. 8 means that combination of the signals with largely different smoothing strengths reduces the approximation accuracy and causes a difference in signal characteristics. Thus, in order to achieve a desired smoothing strength, it is preferable to generate a plurality of taken images (smoothed images) with different smoothing strengths by applying the smoothing process in multiple stages and generate the output image (blurring-emphasized image) through image combination using these smoothed images.

Figure 9:
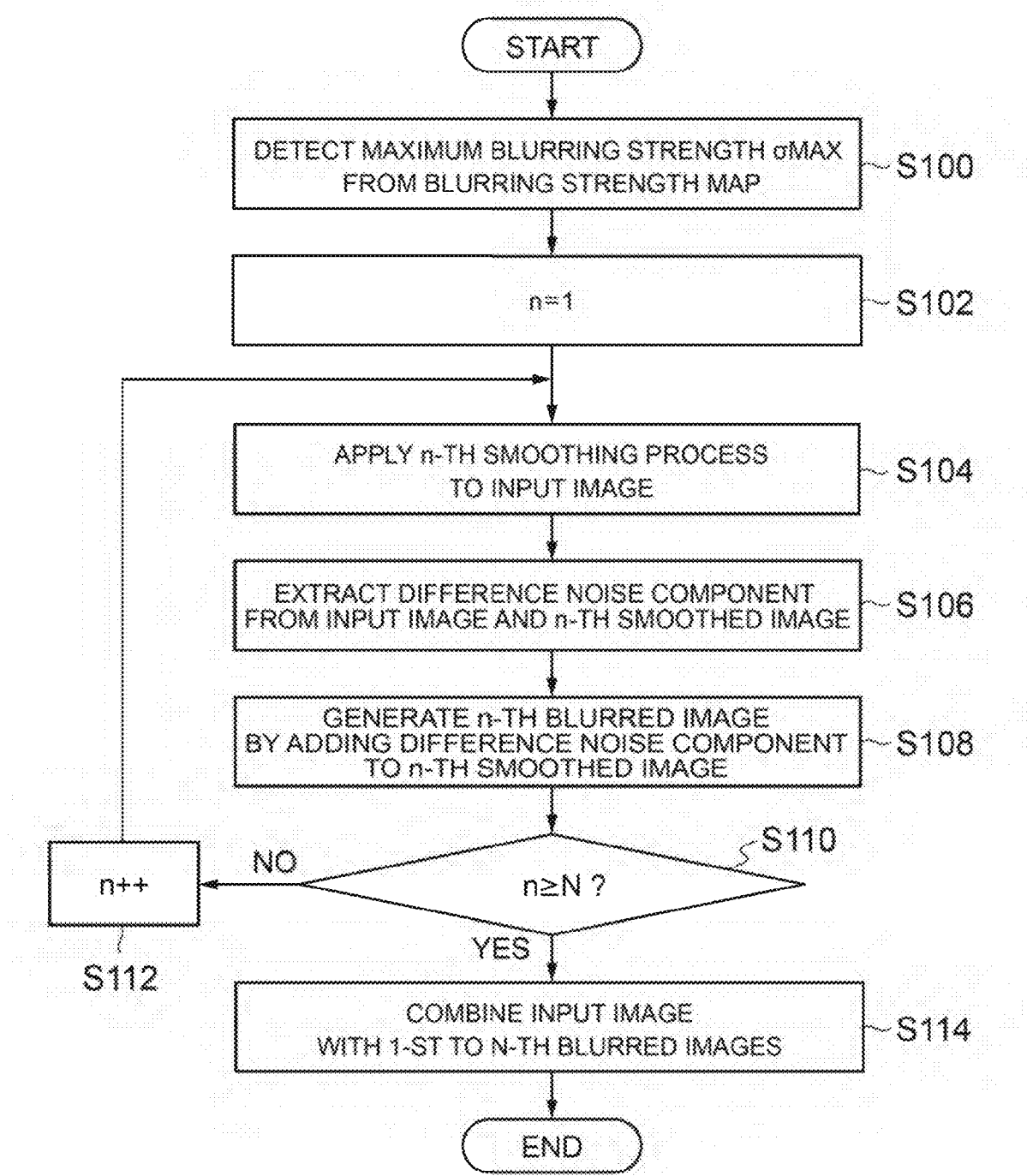
FIG. 9 is a flowchart showing a flow of an example of a blurring-emphasizing process in the case of detecting the maximum blurring strength in the first exemplary embodiment.

FIG. 9 is a flowchart showing a flow of an example of a blurring-emphasizing process in the case of detecting the maximum blurring strength. In this example, the blurring strength map shows the distribution of blurring strengths of the input image (original taken image) on a pixel-by-pixel basis or on each of pixel region. In FIG. 9, first, the smoothing device 114 detects the maximum blurring strength σMAX from blurring strength map, and determines the smoothing strength of smoothing for the taken image (step S100). Steps S102 to S114 are analogous to the processes shown in FIG. 6. However, in step S104, the taken image is smoothed using the smoothing strength determined in step S100.

Second Exemplary Embodiment

Figure 10:
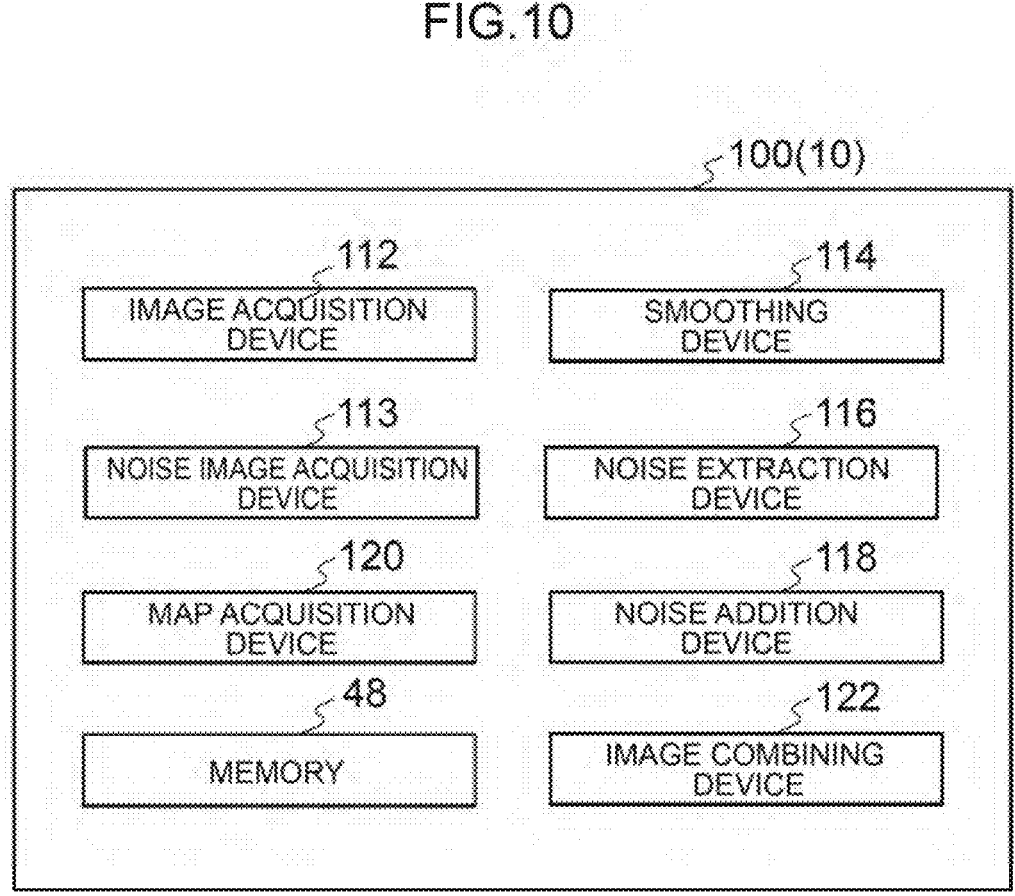
FIG. 10 is a block diagram showing a configuration of an image processing device of a second exemplary embodiment.

FIG. 10 is a block diagram showing a configuration of a main part of an image processing device of a second exemplary embodiment. Hereinafter, an example of a case where the image processing device 100 in FIG. 10 is applied to the imaging device 10 in FIG. 1 and the present invention is applied thereto is described. Note that the same signs are assigned to the respective configuration elements having already shown in FIG. 4 (the first exemplary embodiment). Hereinafter, only items different from those of the first exemplary embodiment are described.

In FIG. 10, a noise image acquisition device 113 acquires a noise image that represents noise included in an input image (original taken image).

The noise image in this example includes the noise identical to the noise included in the input image. Here, the "identical" to the noise included in the input image encompasses the cases where the noise is not completely identical but substantially identical. For instance, the cases encompass the difference of widths of normal distributions (variances or standard deviations) within 5% inclusive, or the difference of noise strengths (noise strengths M(f) dependent on spatial frequencies f) within 10% inclusive.

The noise image acquisition device 113 in this example includes the CPU 40 in FIG. 1, and generates a noise image.

In this example, upon acquisition of the input image, the noise image is acquired by generating the noise image on the basis of this input image. Alternatively, the noise image may be preliminarily generated and stored in a storing device, such as the memory 48 or the memory card 54, and, upon acquisition of the input image, the noise image corresponding to this input image may be acquired from the storing device, such as the memory 48. Note that various modes of generating noise images are described later in detail.

A smoothing device 114 in the second exemplary embodiment has a taken image smoothing function of uniformly smoothing the entire taken image, and a noise image smoothing function of uniformly smoothing the entire noise image. The smoothing device 114 in this example generates a plurality of smoothed images with different smoothing strengths by smoothing the taken image with the respective different smoothing strengths, and generates smoothed noise images with different smoothing strengths by smoothing the noise image with the respective different smoothing strengths used for smoothing the taken image.

Figure 11:
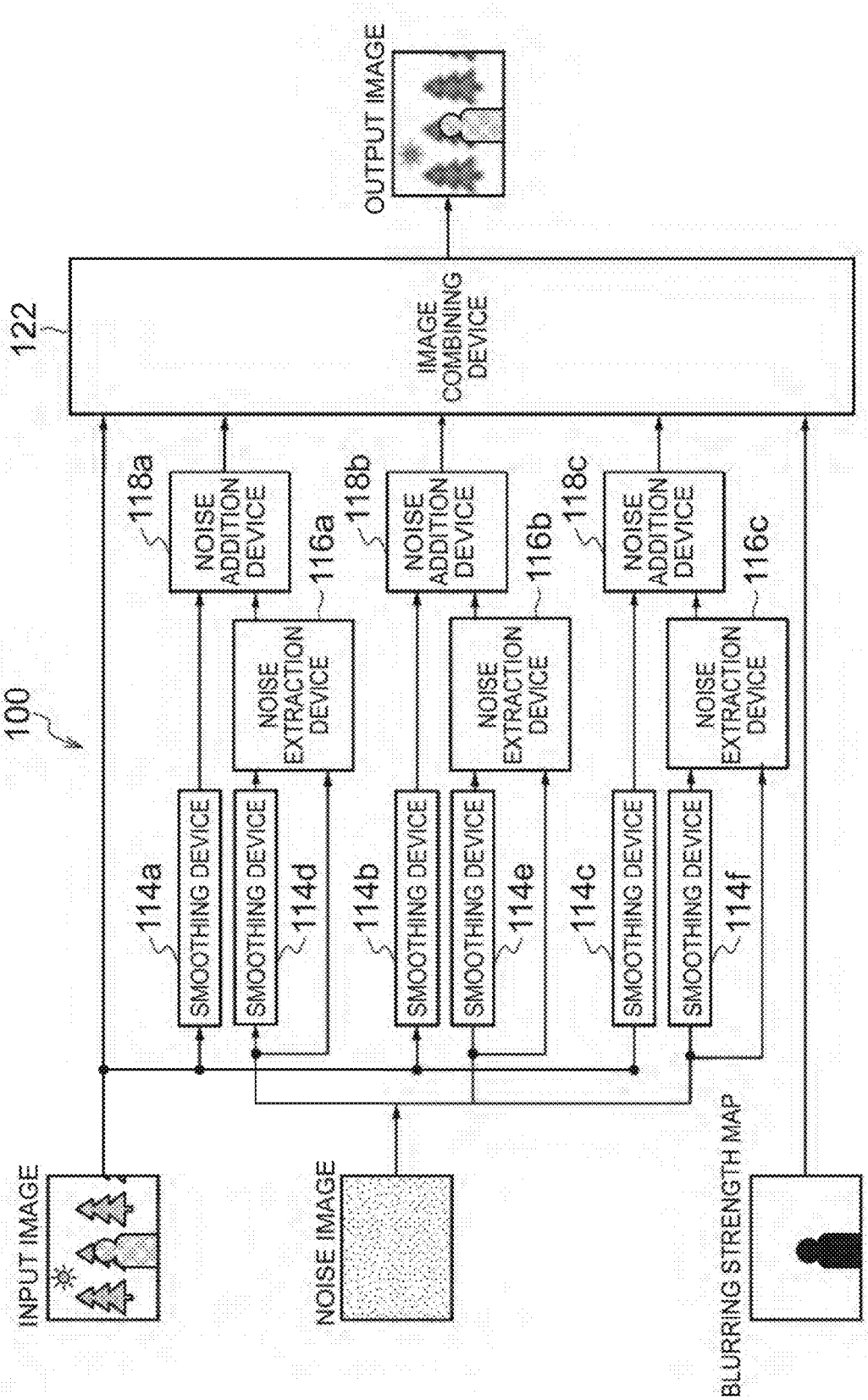
FIG. 11 is a block diagram showing a configuration of a main part of the image processing device in the case of performing multi-stage smoothing in the second exemplary embodiment.

FIG. 11 is a block diagram showing an example of a main part of the image processing device 100 in the case of performing multi-stage smoothing. In order to facilitate understanding of multi-stage smoothing, FIG. 11 shows the case where the image processing device 100 includes smoothing devices 114a, 114b, 114c, 114d, 114e and 114f, noise extraction devices 116a, 116b and 116c, and noise addition devices 118a, 118b and 118c.

The smoothing strengths of the smoothing devices 114a, 114b and 114c for smoothing the taken image are different from each other. The smoothing strengths of the smoothing devices 114d, 114e and 114f for smoothing the noise image are different from each other. The first smoothing device 114a generates a first smoothed image by smoothing the entire input image with a first smoothing strength. The second smoothing device 114b generates a second smoothed image by smoothing the entire input image with a second smoothing strength. The third smoothing device 114c generates a third smoothed image by smoothing the entire input image with a third smoothing strength. The fourth smoothing device 114d generates a first smoothed noise image by smoothing the entire noise image with the first smoothing strength. The fifth smoothing device 114e generates a second smoothed noise image by smoothing the entire noise image with the second smoothing strength. The sixth smoothing device 114f generates a third smoothed noise image by smoothing the entire noise image with the third smoothing strength.

The first noise extraction device 116a extracts a first difference noise component from the difference (difference image) between the noise image and the first smoothed noise image generated by the fourth smoothing device 114d. The second noise extraction device 116b extracts a second difference noise component from the difference (difference image) between the noise image and the second smoothed noise image generated by the fifth smoothing device 114e. The third noise extraction device 116c extracts a third difference noise component from the difference (difference image) between the noise image and the third smoothed noise image generated by the sixth smoothing device 114f. The "difference noise component" in this example includes the difference between noise included in the noise image and noise included in the smoothed noise image, and represents noise reduced from the taken image by smoothing the taken image.

The first noise addition device 118a generates a first blurred image by adding the first difference noise component extracted by the first noise extraction device 116a to the first smoothed image generated by the first smoothing device 114a. The second noise addition device 118b generates a second blurred image by adding the second difference noise component extracted by the second noise extraction device 116b to the second smoothed image generated by the second smoothing device 114b. The third noise addition device 118c generates a third blurred image by adding the third difference noise component extracted by the third noise extraction device 116c to the third smoothed image generated by the third smoothing device 114c.

The image combining device 122 selects multiple (two in this example) images from among the taken image and the first to third blurred images (first to third smoothed images where the first to third difference noise components are respectively added), on a pixel-by-pixel basis in the input image (original taken image) or a region-by-region basis in the taken image, on the basis of the blurring strength represented in the blurring strength map, and calculates a weighted average of pixel values in the selected images, thereby outputting an output image (blurring-emphasized image).

Figure 12:
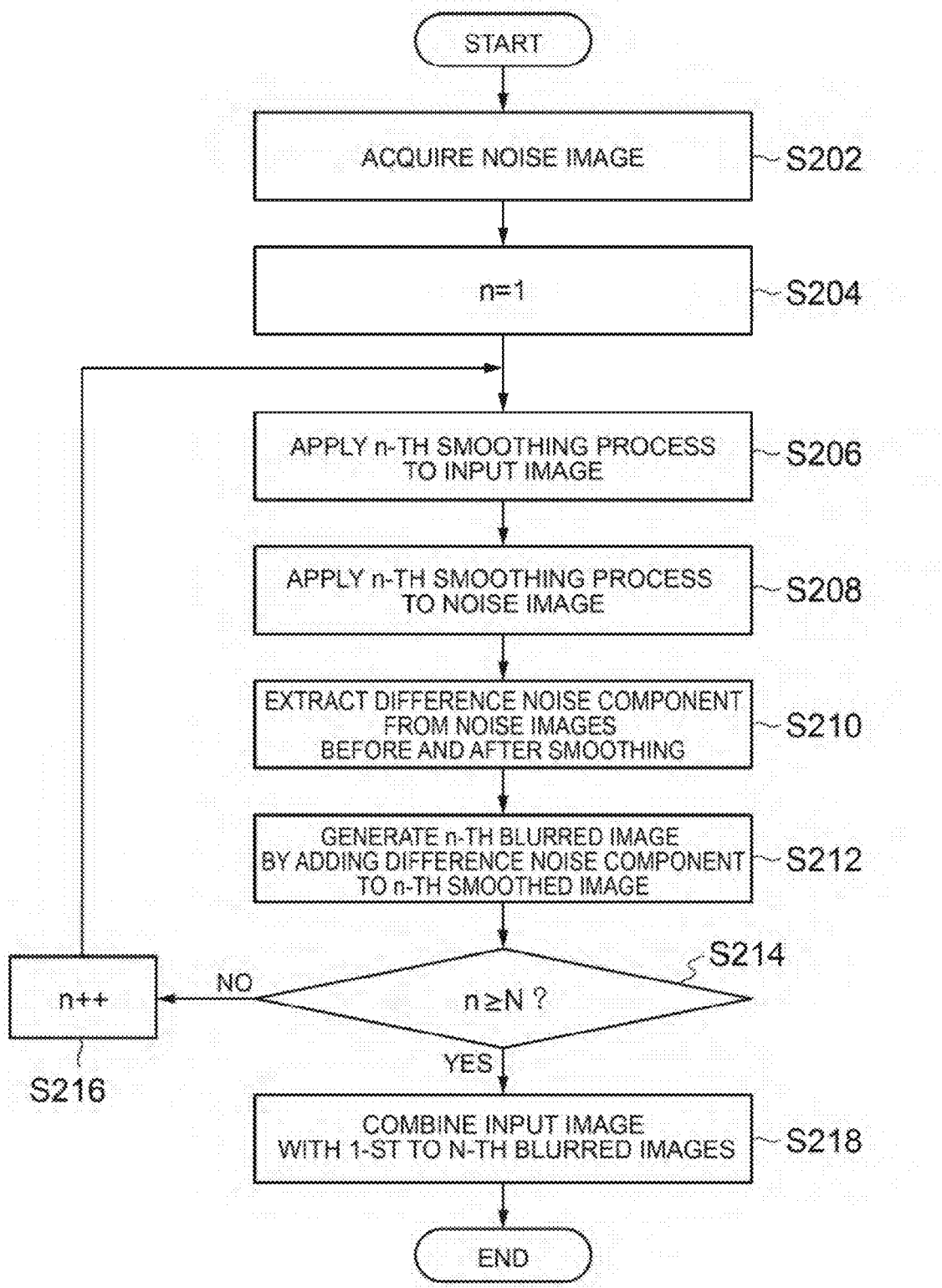
FIG. 12 is a flowchart showing a flow of an example of a blurring-emphasizing process in the second exemplary embodiment.

FIG. 12 is a flowchart showing a flow of an example of a blurring-emphasizing process in the image processing device 100 in FIG. 10. This process is executed by the CPU 40 in FIG. 1 according to a program.

Note that the input image (original taken image) has been acquired by the image acquisition device 112, and the blurring strength map has been acquired by the map acquisition device 120.

First, a noise image is acquired (step S202). The noise image in this example includes noise substantially identical to the noise included in the input image.

Next, a variable n that represents the smoothing stage number is initially set to one (step S204).

Next, the smoothing device 114 applies the n-th smoothing process to the input image (original taken image) that is to be a target of blurring emphasis (step S206: step of generating a smoothed image). That is, the smoothing device 114 generates the n-th smoothed image by uniformly smoothing the entire taken image with the n-th smoothing strength. This step S206 is analogous to step S104 in the first embodiment.

Next, the smoothing device 114 applies the n-th smoothing process to the noise image (step S208: step of generating a smoothed noise image). That is, the smoothing device 114 outputs the n-th smoothed noise image by uniformly smoothing the entire noise image with the n-th smoothing strength used for the n-th smoothing for the input image (original image). Here, the spatial frequency characteristics are matched with each other by matching the smoothing strengths of the n-th smoothed image and the n-th smoothed noise image with each other.

Next, the noise extraction device 116 generates the n-th difference noise image corresponding to the n-th smoothed image by extracting the noise (difference noise) component from the difference (difference image) between the noise image and the n-th smoothed noise image (step S210: noise extraction step). Thus, the noise (difference noise) component reduced from the input image (original image) by smoothing with the n-th smoothing strength is extracted as the difference noise image. The difference noise image in this example is representation where the difference noise component between the noise image and the n-th smoothed noise image on a pixel-by-pixel basis as with the n-th smoothed image.

Next, the noise addition device 118 generates the n-th blurred image by adding the n-th difference noise image (difference noise component) to the n-th smoothed image (step S212: noise addition step). This step S212 is analogous to step S108 in the first embodiment. Thus, the noise (difference noise) component reduced from the input image by smoothing with the n-th smoothing strength is added back to the input image. That is, the image (blurred image) where signal components other than the noise among the signal components of the input image are smoothed is generated.

Next, it is determined whether the variable n reaches the number of repetition times N or not (step S214).

If n<N, the variable n is incremented (addition of "1") (step S216), and the processing returns to step S206.

If n≥N (if n reaches N), the image combining device 122 generates an output image with a distribution of blurring strengths according to the blurring strength map by combining the input image (original taken image) with the first to N-th blurred images (smoothed images to which the difference noise component is added) on the basis of the blurring strength map (step S218: image combining step).

In this example, multiple (e.g., two) images are selected from among the input image and the first to N-th blurred images (first to N-th smoothed images where the respective first to N-th difference noise components are added), on a pixel-by-pixel basis in the input image (or a region-by-region basis in the taken image), on the basis of the blurring strength represented in the blurring strength map, and a weighted average of pixel values in the selected images are calculated, thereby outputting an output image (blurring-emphasized image).

<Noise Image Generation>

Next, various modes of noise image generation are described.

(One Mode of Noise Image Generation)

A mode of noise image generation may be a mode that generates a noise image by extracting noise from the input image (original taken image).

Figure 13:
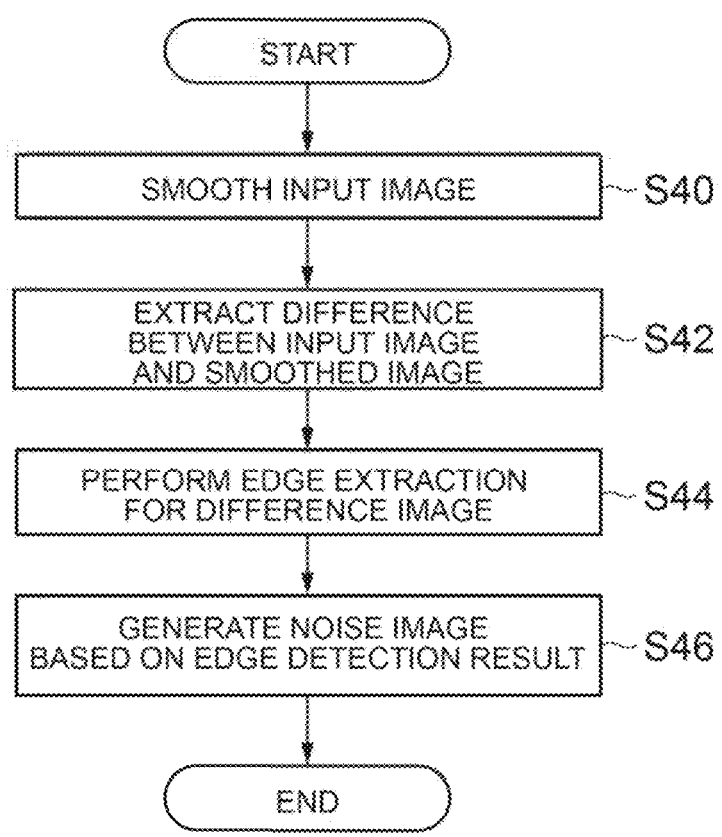
FIG. 13 is a flowchart showing a flow of an example of a noise image generation process.

FIG. 13 is a flowchart showing a flow of an example of the noise image generation process. This process is executed by the CPU 40 according to a program.

First, the input image (original taken image) is smoothed (step S40). More specifically, an taken image with the maximum blurring (taken image smoothed with the maximum smoothing strength) is generated as a smoothed image by smoothing the input image with the maximum smoothing strength using an LPF (low-pass filter), such as a Gaussian filter as a smoothing filter. In this example, the input image is smoothed using, as the maximum smoothing strength, a smoothing strength (maximum smoothing strength) that is larger than any of the first to N-th smoothing strengths used for input image smoothing (step S206 in FIG. 12).

Next, the difference between the input image (original taken image) and the input image (smoothed image) smoothed in step S40 is extracted (step S42). In this example, a difference image that includes medium and high frequency components of the input image is generated by extracting the difference between the pixel value of the input image and the pixel value of the smoothed image on a pixel-by-pixel basis.

Next, edge detection is performed for the difference image (step S44).

More specifically, the edge detection is performed by applying a HPF (high-pass filter) or BPF (band-pass filter) to the difference image (difference between the input image and the smoothed image). For instance, the HPF (high-pass filter) or BPF (band-pass filter) is applied on a pixel-by-pixel basis in four directions, i.e., the horizontal direction (0 degree), vertical direction (90 degrees), diagonally upper right direction (45 degrees), diagonally upper left direction (135 degrees). In particular, a first differential filter (e.g., [−1:0:1]) and a second differential filter (e.g., [−1:2:−1]) are effective. The highest value (maximum value Hmax) among absolute values Hh, Hv, Hne and Hnw of filter output values in the horizontal direction, vertical direction, diagonally upper right direction and diagonally upper left direction is acquired, and this maximum value Hmax is compared with a threshold hpf_th1, thereby determining as follows.

(a) If Hmax>hpf_th1, the significant pixel is an edge component, and (b) if Hmax≤hpf_th1, the significant pixel is a noise component.

That is, it is determined whether the signal component of the difference image is an edge component or a noise component.

Next, a noise image is generated on the basis of the edge detection result (step S46). That is, the edge component is removed from the difference image.

Note that the difference image includes not only a noise signal (noise) but also a true signal (subject image component) that represents a subject image.

Accordingly, a signal having a minute amplitude is regarded as a noise signal, it is determined that a signal having an amplitude (pixel value) that is equal to or less than a threshold a as a noise signal, and the signal having an amplitude exceeding the threshold a is removed. This process is equivalent to a process that applies, for instance, a nonlinear function shown in FIG. 14 to the difference image, and adopts the output as a noise image. Thus, the noise image that includes noise identical to the noise included in the input image (original taken image) can be generated.

Figure 14:
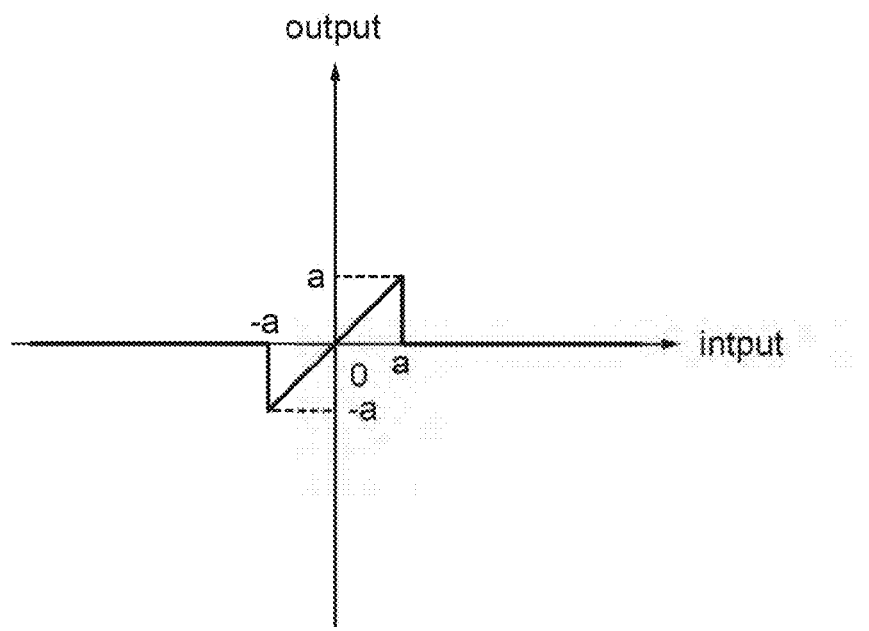
FIG. 14 is an illustration diagram used for illustrating noise component extraction.
Figure 15:
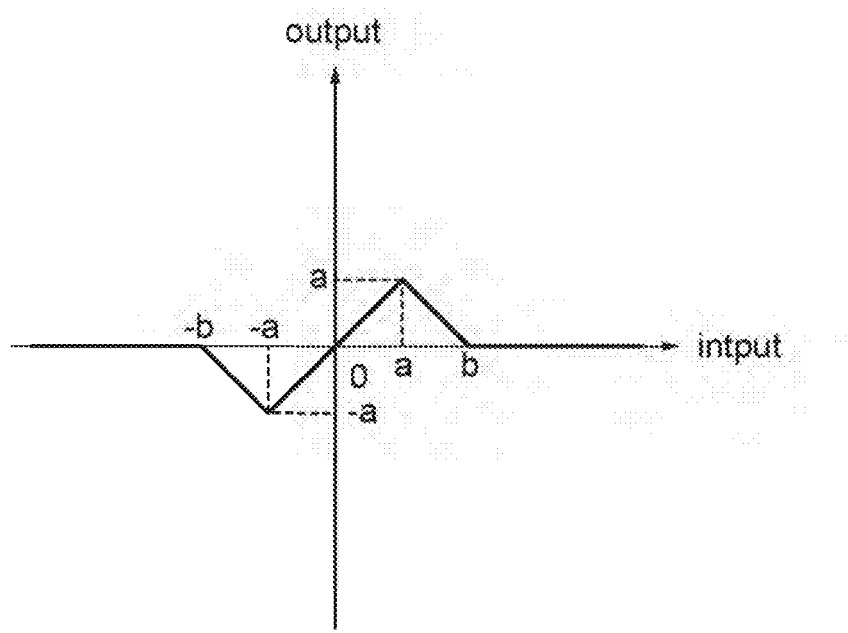
FIG. 15 is an illustration diagram used for illustrating noise component extraction.

Note that noise component extraction according to the nonlinear function shown in FIG. 14 causes signal discontinuity around the threshold a. Accordingly, it is preferable to perform noise component extraction according to the nonlinear function shown in FIG. 15. The nonlinear function in FIG. 15 removes a signal that is equal to or higher than a threshold a and below a threshold b according to the amplitude (removes the signal such that the larger the amplitude is, the smaller the output component becomes), and completely removes the signal that has an amplitude exceeding the threshold b. If the nonlinear function in FIG. 15 is used, the signal having an amplitude larger than the threshold a is not removed. Instead, as the amplitude approaches b (>a) from a, the output approaches zero.

Note that step S42 in noise image generation shown in FIG. 13 is applicable to step S106 in the first embodiment shown in FIGS. 6 and 9. More specifically, as described using FIGS. 13, 14 and 15, in step S106 (difference noise extraction) in the first embodiment, a true difference noise component can be extracted from the difference image (difference between the input image and the smoothed image) by performing the edge detection (step S44) and removes components other than the noise component (step S46).

(Another Mode of Noise Image Generation)

Another mode of noise image generation may be a mode that does not extract noise from the input image (original taken image) but generates a noise image on the basis of imaging conditions of the taken image (the focus condition and zoom condition of the imaging lens 12, the aperture condition of the diaphragm 14, the driving condition of the image pickup element (e.g., CCD 16), the signal processing condition of the analog signal processor 20, etc.) or the imaging characteristics (the characteristics of the imaging lens 12, the characteristics of the image pickup element (e.g., CCD 16), the characteristics of signal processing by the analog signal processor 20, etc.) of the imaging device 10 having taken the taken image.

In an example of noise image generation based on the imaging characteristics of the imaging device 10, the noise image may be generated according to a model of the imaging device 10. The noise amount is determined by a model of noise generation and transmission in the imaging device 10. In general, the noise amount generated in the image pickup element (e.g., CCD 16 in FIG. 1) monotonically increases with the amount of light received by the photodiode. The amount of light received by the photodiode is the pixel value of the taken image. Accordingly, the noise amount z can be considered a function that adopts the pixel value v as a parameter. The characteristics of noise generated in the image pickup element are changed each time when being subjected to various types of signal processing. Noise transmission in the signal processing is not described here. The noise amount with respect to the pixel value v is defined as fn(v). The noise image is then generated from the noise amount fn(v) estimated on the basis of the pixel value of the taken image.

Figure 16:
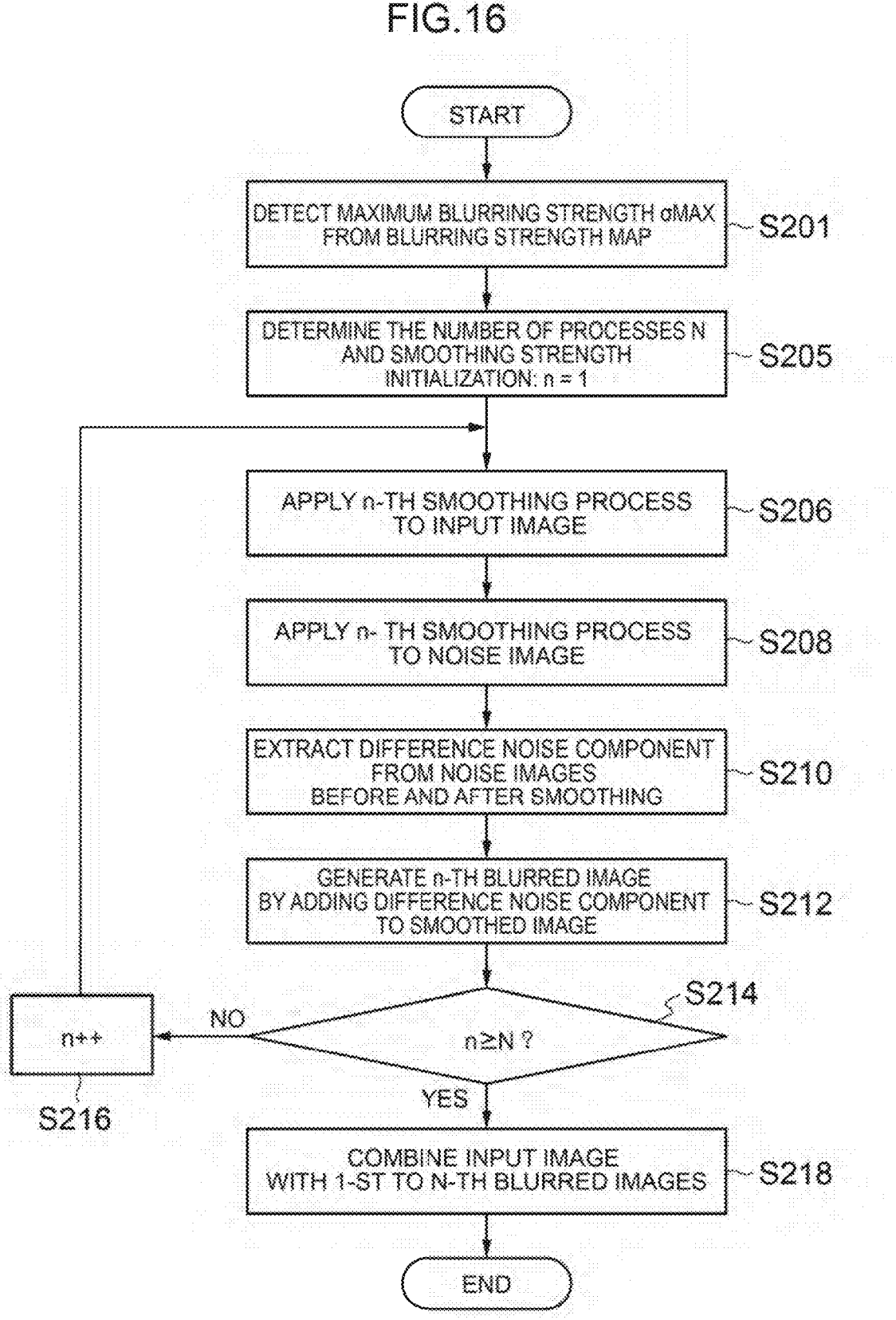
FIG. 16 is a flowchart showing a flow of an example of a blurring-emphasizing process in the case of detecting the maximum blurring strength in the second exemplary embodiment.

FIG. 16 is a flowchart showing a flow of an example of a blurring-emphasizing process in the case of detecting the maximum blurring strength. In this example, the blurring strength map shows the distribution of blurring strengths (purposed blurring strength) in the output image (blurring-emphasized image) on a pixel-by-pixel basis or each pixel region in the input image (original taken image). In FIG. 16, first, the smoothing device 114 detects the maximum blurring strength σMAX from the blurring strength map (step S201). Next, the number of processes N and the smoothing strengths of smoothing for the taken image and the noise image are determined on the basis of the maximum blurring strength σMAX (step S205). In this example, on the basis of the strength σMAX, the smoothing strength is determined, and the numbers of repetitions (the number of stages) of smoothing, noise extraction and noise addition are also determined. Steps S206 to S218 are analogous to the processes shown in FIG. 12. However, in step S206, the taken image is smoothed using the smoothing strength determined in step S205. In step S208, the noise image is smoothed using the smoothing strength determined in step S205.

Third Exemplary Embodiment

Figure 17:
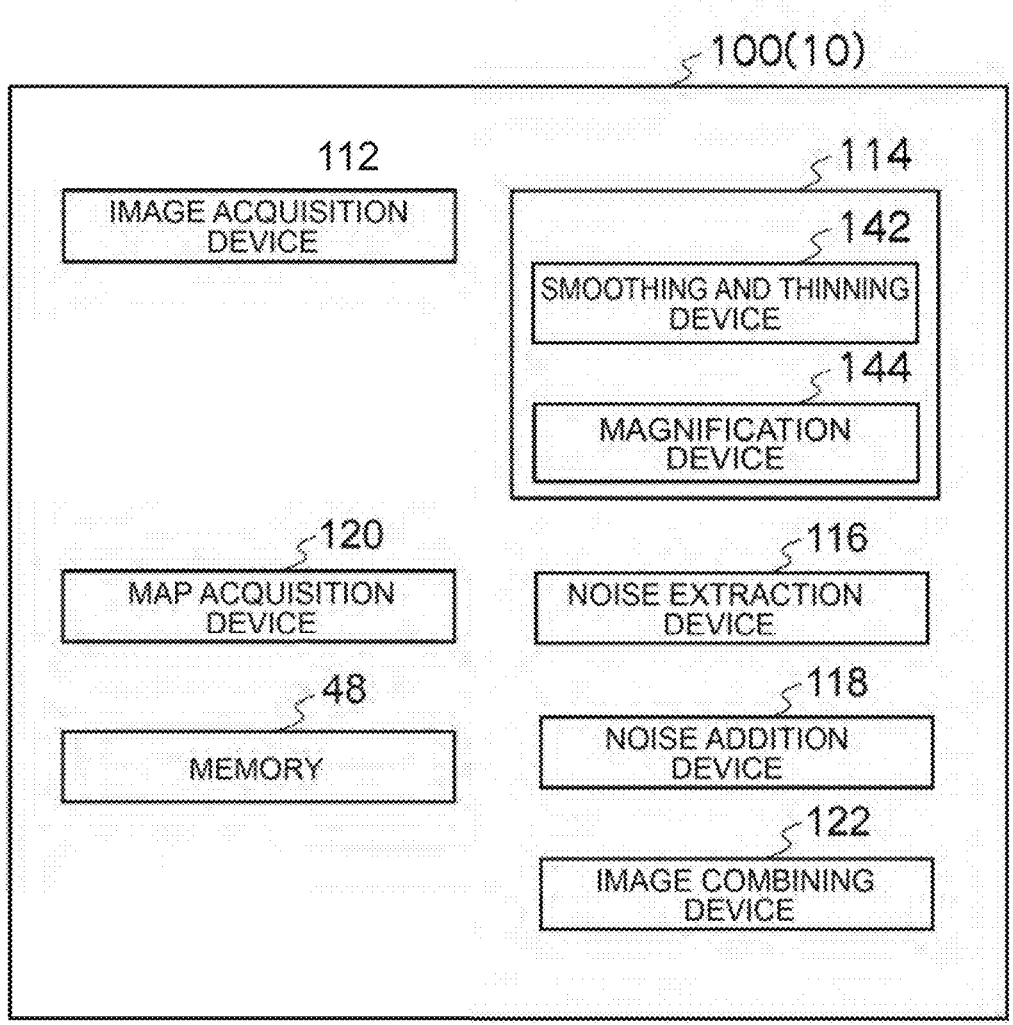
FIG. 17 is a block diagram showing a configuration of an image processing device of a third exemplary embodiment.

FIG. 17 is a block diagram showing a configuration of a main part of an image processing device of a third exemplary embodiment. Hereinafter, an example of a case where the image processing device 100 in FIG. 17 is applied to the imaging device 10 in FIG. 1 and the present invention is applied thereto is described. Note that the same signs are assigned to the respective configuration elements having already shown in FIG. 4 (the first exemplary embodiment). Hereinafter, only items different from those of the first exemplary embodiment are described.

In FIG. 17, the smoothing device 114 includes a smoothing and a thinning device 142 (thinning device) for reducing the image size (vertical size and horizontal size) by pixel thinning, and a magnification device 144 for increasing the image size (vertical size and horizontal size) by pixel interpolation.

The smoothing device 114 in this example generates multiple smoothed images with different smoothing strengths and image sizes by repeating, multiple times, smoothing with the same smoothing strength and pixel thinning with the same reduction magnification by the smoothing and thinning device 142. The smoothing device 114 in this example converts multiple smoothed images with different smoothing strengths and image sizes into multiple smoothed images with different smoothing strengths but with the same image size by the magnification device 144.

Figure 18:
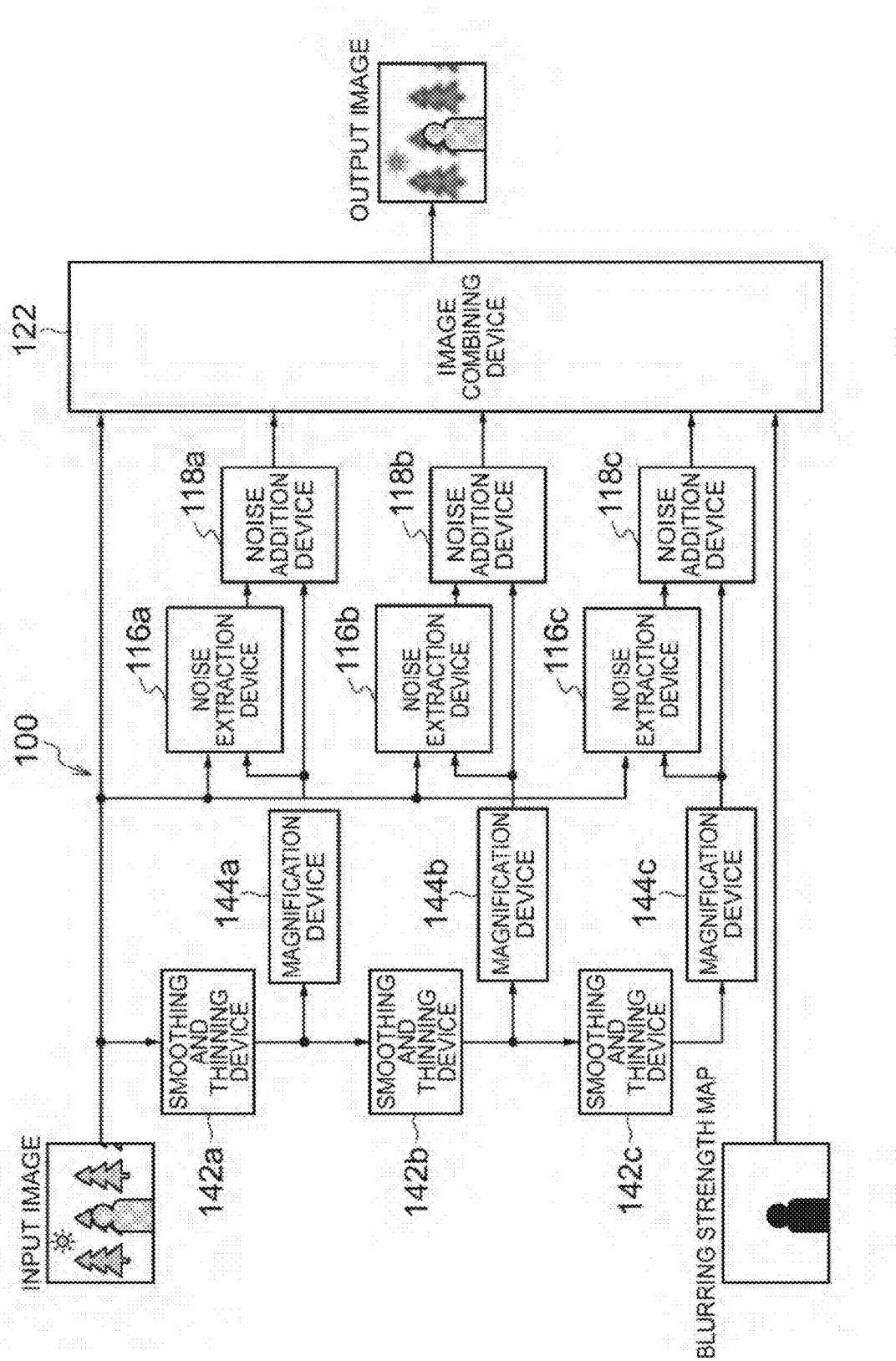
FIG. 18 is a block diagram showing a configuration of a main part of the image processing device in the case of performing multi-stage smoothing in the third exemplary embodiment.

FIG. 18 is a block diagram showing an example of a main part of the image processing device 100 in the case of performing multi-stage smoothing. Note that the same signs are assigned to the same elements of the image processing device 100 in the first exemplary embodiment shown in FIG. 5. Here, only items different from those of the first exemplary embodiment are described.

In order to facilitate understanding of multi-stage smoothing, FIG. 18 shows the case where the image processing device 100 includes smoothing and thinning devices 142a, 142b and 142c, magnification devices 144a, 144b and 144c, noise extraction devices 116a, 116b and 116c, and noise addition devices 118a, 118b and 118c.

Among the smoothing and thinning devices 142a, 142b and 142c, the smoothing strength and the reduction magnification for the image size are the same. Among the magnification devices 144a, 144b and 144c, the enlarging magnification of the image size is the same. For instance, the reduction magnification is ¼, and the enlarging magnification is four, and reduction magnification×enlarging magnification=1.

FIG. 18 shows a three-stage configuration. Accordingly, the first smoothing and thinning device 142a generates a first smoothed image reduced in size to be ¼. The second smoothing and thinning device 142b generates a second smoothed image reduced in size to be ¹⁄₁₆. The third smoothing and thinning device 142c generates a third smoothed image reduced in size to be ¹⁄₆₄. Furthermore, the first magnification device 144a enlarges the first smoothed image four times. The second magnification device 144b enlarges the second smoothed image 16 times. The third magnification device 144c enlarges the third smoothed image 64 times. Thus, the image sizes of the first to third smoothed images are restored to be the same image size as the size of the input image.

Figure 19:
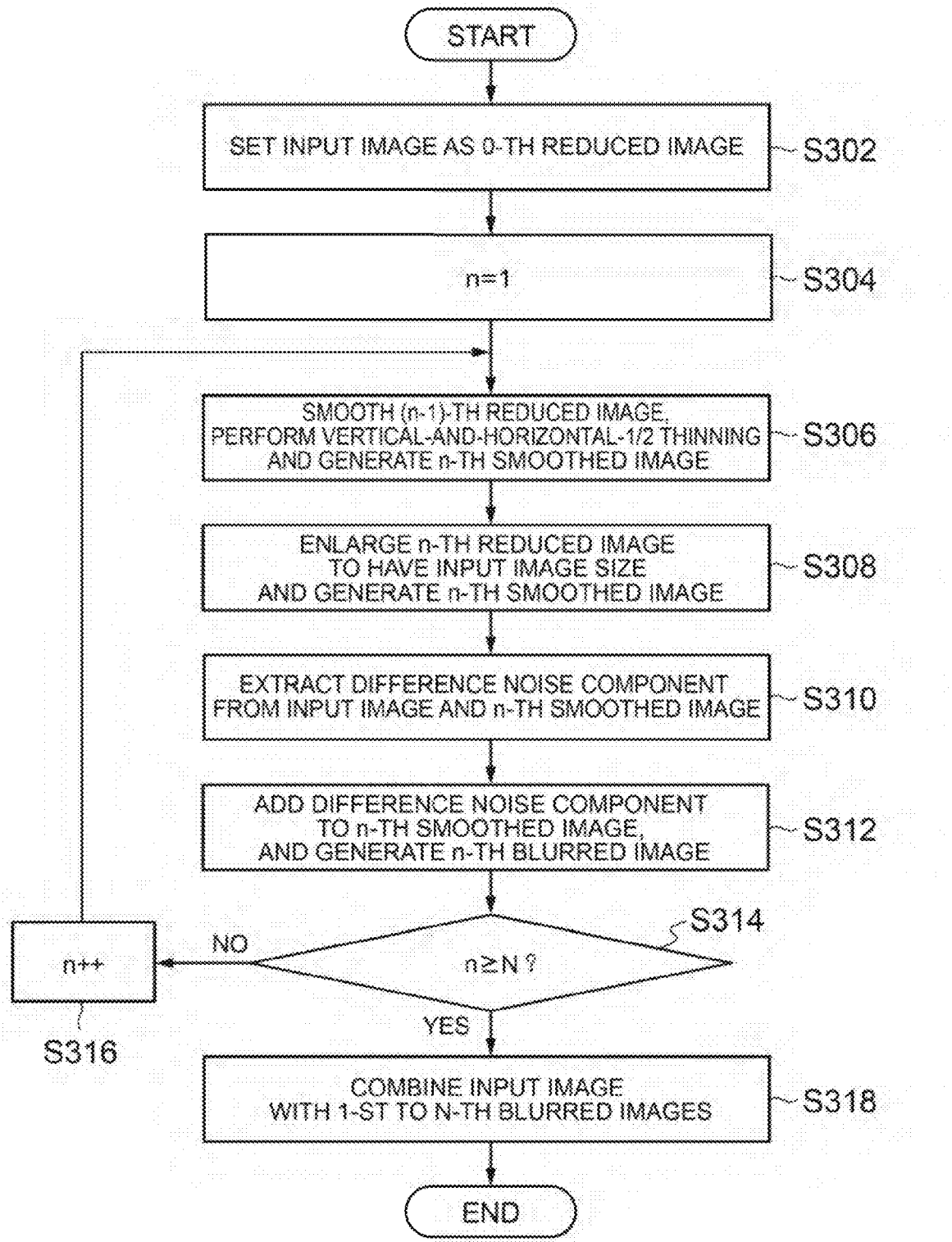
FIG. 19 is a flowchart showing a flow of an example of a blurring-emphasizing process in the third exemplary embodiment.

FIG. 19 is a flowchart showing a flow of a blurring-emphasizing process in the image processing device 100 in FIG. 17. This process is executed by the CPU 40 according to a program.

Note that the input image (original taken image) has been acquired by the image acquisition device 112, and the blurring strength map has been acquired by the map acquisition device 120.

First, the input image is regarded as a 0-th reduced image, and the reduction magnification for the vertical size and the horizontal size of the input image is initially set to "1" (step S302).

Next, the variable n is initially set to one (step S304).

Next, the smoothing and thinning device 142 applies the n-th smoothing process and pixel thinning to the (n−1)-th reduced image to thereby reduce the image size (vertical size and horizontal size) of the (n−1)-th reduced image at a certain reduction magnification (in this example, a vertical size of ½ times×a horizontal size of ½ times=¼ times), and generates the n-th reduced image (step S306).

Next, the magnification device 144 performs pixel interpolation for the n-th reduced image to thereby enlarge the image size of the n-th reduced image to the image size of the input image, and generates the n-th smoothed image (step S308).

Next, the noise extraction device 116 generates the n-th difference noise image corresponding to the n-th smoothed image by extracting a noise component (difference noise component) from the difference (difference image) between the input image (original taken image) and the n-th smoothed image (step S310). This process is the same as step S106 in the first embodiment.

Next, the noise addition device 118 generates the n-th blurred image (smoothed image to which the difference noise image is added) by adding the n-th difference noise image to the n-th smoothed image (step S312). This process is the same as step S108 in the first embodiment.

Next, it is determined whether the variable n reaches the number of repetition times N (the number of processes) or not (step S314).

If n<N, the variable n is incremented (addition of "1") (step S316), and the processing returns to step S306.

If n≥N (if n reaches N), the image combining device 122 generates an output image with a distribution of blurring strengths according to the blurring strength map by combining the input image (original taken image) with the first to N-th blurred images (smoothed images to which the difference noise image is added) on the basis of the blurring strength map (step S318).

Figure 20:
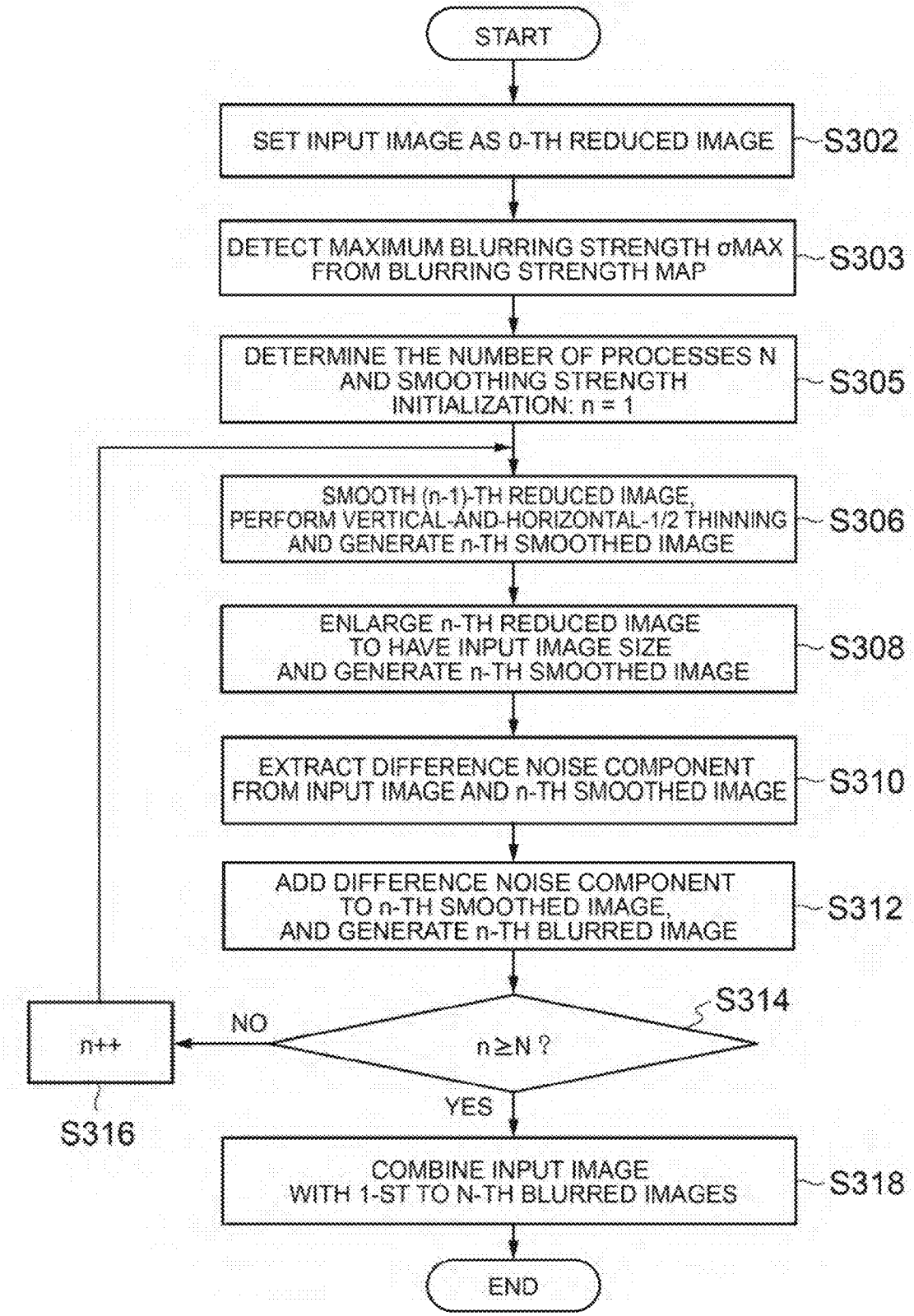
FIG. 20 is a flowchart showing a flow of an example of a blurring-emphasizing process in the case of detecting the maximum blurring strength in the third exemplary embodiment.

FIG. 20 is a flowchart showing a flow of an example of a blurring-emphasizing process in the case of detecting the maximum blurring strength. In this example, the blurring strength map shows the distribution of blurring strengths of the input image (original taken image) on a pixel-by-pixel basis or on each of pixel region. In FIG. 20, the smoothing device 114 detects the maximum blurring strength σMAX from the blurring strength map (step S303). The number of processes N and the smoothing strengths for smoothing of the taken image are determined on the basis of the maximum blurring strength σMAX (step S305). Steps S306 to S318 are analogous to the processes shown in FIG. 19. However, in step S306, the taken image is smoothed using the smoothing strength determined in step S305.

In general, increase in smoothing strength requires a filter process having a large number of taps, and increases the circuit scale. However, in the third exemplary embodiment, the filter process having a small number of taps (smoothing process) and pixel thinning are repeated multiple times. This repetition can suppress the circuit scale, and generate multiple smoothed images with different smoothing strengths, thereby exerting advantageous effects analogous to those of the first exemplary embodiment. Note that since thinning reduces the image, the process of enlarging the size to the same size as that of the input image is performed.

Note that in the third exemplary embodiment, the example where thinning and enlarging processes are added to the first exemplary embodiment has been described. However, the present invention is not limited thereto. It is a matter of course the thinning and enlarging processes described in the third exemplary embodiment may be added to the second exemplary embodiment.

<Configuration of Smartphone>

Figure 21:
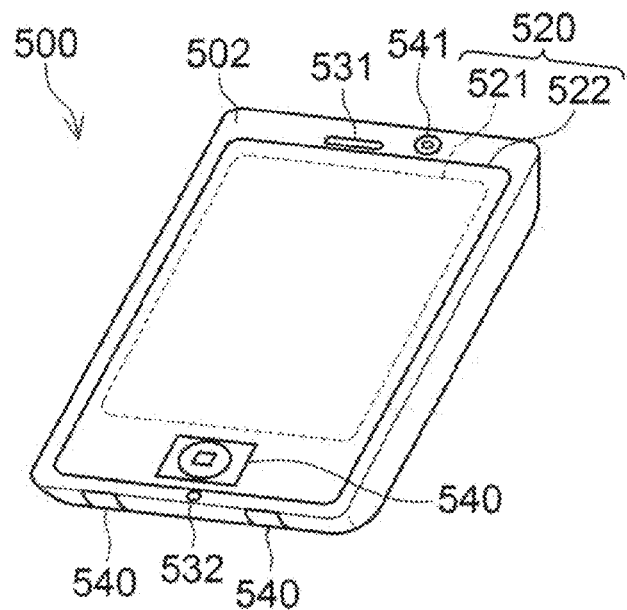
FIG. 21 is an appearance diagram of a smart phone that is another embodiment of an image processing device according to the present invention.

FIG. 21 shows an appearance of a smartphone 500 that is an example of another embodiment where an image processing device according to the present invention is applied to a mobile electronic device. A smartphone 500 shown in FIG. 21 has a flat-shaped casing 502, and includes a display input unit 520 in which a display panel 521 as a display unit and an operation panel 522 as an input unit are integrated on one face of the casing 502. The casing 502 further includes a speaker 531, a microphone 532, an operation unit 540, and a camera unit 541. Note that the configuration of the casing 502 is not limited thereto. For instance, a configuration where the display unit and the input unit are independent from each other may be adopted, or a configuration that has a folding structure or a sliding mechanism may be adopted.

Figure 22:
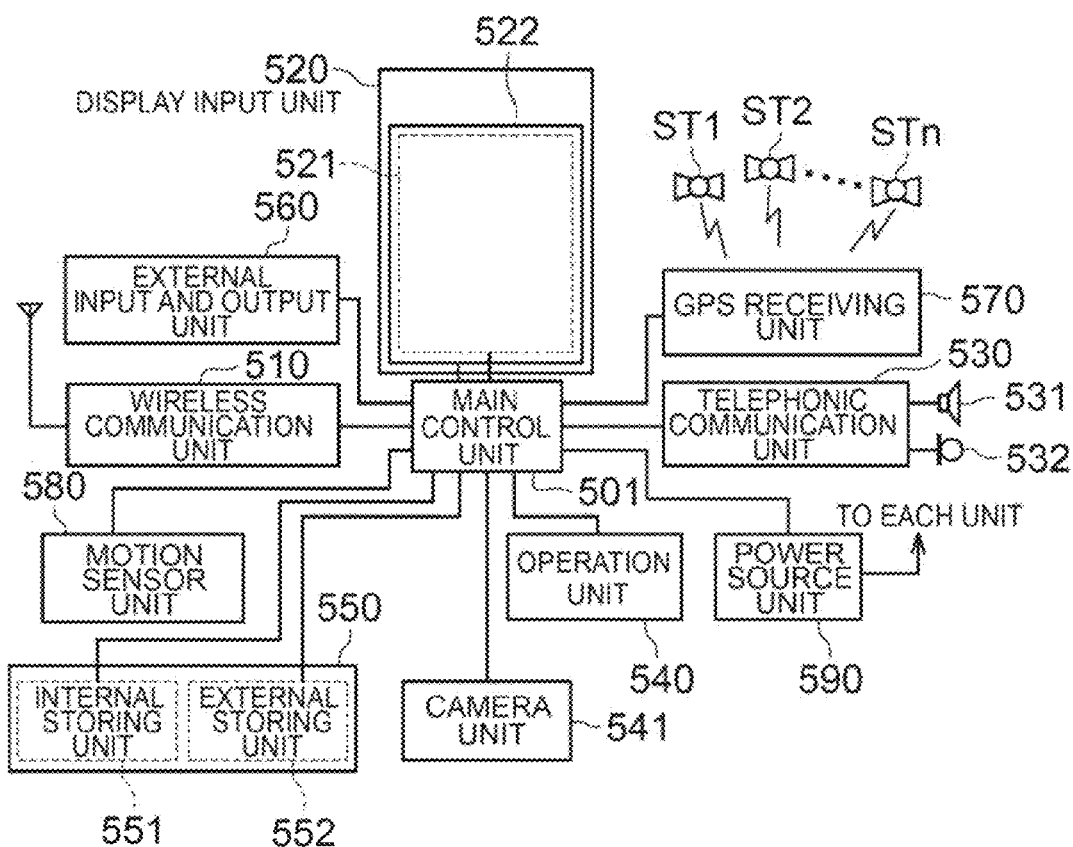
FIG. 22 is a block diagram showing a configuration of the smartphone.

FIG. 22 is a block diagram showing the configuration of the smartphone 500 shown in FIG. 21. As shown in FIG. 22, the smartphone includes main configuration elements, which are a wireless communication unit 510, the display input unit 520, a telephonic communication unit 530, the operation unit 540, the camera unit 541, a storing unit 550, an external input and output unit 560, a GPS (Global Positioning System) receiving unit 570, a motion sensor unit 580, a power source unit 590, and a main control unit 501. Furthermore, the smartphone 500 has a main function that is a wireless communication function of performing mobile wireless communication via a base station apparatus BS and a mobile communication network NW.

The wireless communication unit 510 performs wireless communication with the base station apparatus BS accommodated in the mobile communication network NW, according to an instruction from the main control unit 501. Through use of the wireless communication, various types of file data, such as audio data and image data, and email data are transmitted and received, and web data, streaming data and the like are received.

The display input unit 520 is what is called an operation panel that is controlled by the main control unit 501 to display images (still images and moving images), character information, etc. and visually transmit information to a user, and detect a user operation to the displayed information, and includes the display panel 521 and the operation panel 522.

The display panel 521 is a LCD (Liquid Crystal Display), an OELD (Organic Electro-Luminescence Display) or the like that is used as a display device. The operation panel 522 is a device is disposed on a display screen of the display panel 521 in a manner allowing a displayed image to be viewed, and operated by a finger of the user or a stylus and detects one or multiple coordinates. When the device is operated by the finger of the user or the stylus, a detection signal generated by the operation is output to the main control unit 501. Next, the main control unit 501 detects an operation position (coordinates) on the display panel 521 on the basis of the received detection signal.

As shown in FIG. 21, the display panel 521 and the operation panel 522 of the smartphone 500 are integrated to configure the display input unit 520, and are arranged such that the operation panel 522 completely covers the display panel 521. In the case of adopting this arrangement, the operation panel 522 may has a function of detecting a user operation also in a region out of the display panel 521. In other words, the operation panel 522 may include a detection region for an overlap portion overlapping with the display panel 521 (hereinafter, referred to as a display region) and another display region for a peripheral portion that does not overlap with the display panel 521 (hereinafter, referred to as non-display region).

The size of the display region and the size of the display panel 521 may be completely matched with each other. However, it is not necessarily to match both areas. Furthermore, the operation panel 522 may include two sensing regions that are a peripheral portion and an inner portion other than the peripheral portion. Moreover, the width of the peripheral portion is appropriately designed according to the size of the casing 502 and the like. Furthermore, a position detection system adopted in the operation panel 522 may be any of a matrix switch system, a resistance film system, a surface acoustic wave, an infrared system, an electromagnetic induction system, an electrostatic capacitance system and the like.

The telephonic communication unit 530, which includes the speaker 531 and the microphone 532, converts an audio of the user input via the microphone 532 into audio data that can be processed in the main control unit 501 and outputs the data to the main control unit 501, and decodes the audio data received by the wireless communication unit 510 or the external input and output unit 560 and outputs the data from the speaker 531. As shown in FIG. 21, for instance, the speaker 531 can be mounted on the same surface as the surface on which the display input unit 520 is provided. Furthermore, the microphone 532 can be mounted on a side of the casing 502.

The operation unit 540 is hardware keys using key switches or the like, and accepts an instruction from the user. For instance, as shown in FIG. 21, the operation unit 540 is mounted below or on a lower side surface of the display unit of the casing 502 of the smartphone 500. This operation unit is a press button switch that is turned on by being depressed by a finger or the like, and turned off by the resilience of a spring or the like when the finger is removed.

The storing unit 550 stores a control program and control data for the main control unit 501, application software, address data associated with the names and phone numbers of communication opposite parties, data of transmitted and received email, web data downloaded through web browsing, and downloaded content data, and temporarily stores streaming data. The storing unit 550 includes an internal storing unit 551 embedded in the smartphone, and an external storing unit 522 that has a detachable external memory slot. Note that the internal storing unit 551 and the external storing unit 552, which respectively configure the storing unit 550, are implemented using any of storing media, such as a flash memory type, hard disk type, multimedia card micro type, and card type memories (e.g., Micro SD® memory etc.), a RAM (Random Access Memory), a ROM (Read Only Memory) and the like.

The external input and output unit 560 serves as an interface with all external devices connected to the smartphone 500, and is for direct or indirect connection to another external device via communication or the like (e.g., Universal Serial Bus (USB), IEEE1394, etc.) or a network (e.g., the Internet, wireless LAN, Bluetooth®, RFID (Radio Frequency Identification), Infrared Data Association: IrDA®, UWB (Ultra Wideband)®, ZigBee®, etc.).

The external devices connected to the smartphone 500 are, for instance, wired and wireless headsets, wired and wireless external chargers, wired and wireless data ports, a memory card connected via a card socket, SIM (Subscriber Identity Module Card)/UIM (User Identity Module Card) card, an external audio video device connected via an audio video I/O (Input/Output) terminal, a wirelessly connected external audio video device, smartphones connected in wired and wireless manners, personal computers connected in wired and wireless manners, PDAs connected in wired and wireless manners, and personal computers and earphones connected in wired and wireless manners. The external input and output unit can transmits data sent from such an external device, to each configuration element in the smartphone 500, and allow data in the smartphone 500 to be transmitted to the external device.

The GPS receiving unit 570 receives GPS signals transmitted from GPS satellites ST1 to STn, according to an instruction by the main control unit 501, executes a positioning operation process based on the received GPS signals, and detects the position of the smartphone 500 that includes the latitude, longitude and altitude. When position information can be acquired from the wireless communication unit 510 or the external input and output unit 560 (e.g., wireless LAN), the GPS receiving unit 570 can detect the position using the position information.

The motion sensor unit 580 includes, for instance, a three-axis acceleration sensor and the like, and detects physical movement of the smartphone 500 according to the instruction by the main control unit 501. Through detection of the physical movement of the smartphone 500, the movement direction and acceleration of the smartphone 500 are detected. The detection result is output to the main control unit 501.

The power source unit 590 supplies power stored in a battery (not shown) to each unit of the smartphone 500 according to the instruction by the main control unit 501.

The main control unit 501 includes a microprocessor, operates according to a control program and control data stored in the storing unit 550, and integrally controls each unit of the smartphone 500. The main control unit 501 has a mobile communication control function of controlling each unit of the communication system, and an application processing function, for performing audio communication and data communication via the wireless communication unit 510.

The application processing function can be achieved by the main control unit 501 operating according to application software stored in the storing unit 550. The application processing function is, for instance, an infrared communication function of controlling the external input and output unit 560 to perform data communication with an opposite device, an email function of transmitting and receiving email, and a web browsing function of browsing web pages.

The main control unit 501 has an image processing function of displaying images and the like on the display input unit 520 on the basis of image data (still image and moving image data), such as received data and downloaded streaming data. The image processing function is a function of the main control unit 501 decoding the image data, applying an image processing to the decoded result, and displaying the image on the display input unit 520.

Furthermore, the main control unit 501 executes display control for the display panel 521, and operation detection control that detects user operations via the operation unit 540 and the operation panel 522.

According to execution of the display control, the main control unit 501 displays an icon for activating application software, and software keys, such as scrollbars, or displays a window for creating email. Note that scrollbars are software keys for accepting instructions for moving a displayed part of an image that is large and cannot be accommodated in a display region on the display panel 521.

Through execution of the operation detection control, the main control unit 501 detects a user operation via the operation unit 540, accepts an operation to the icon and an input of a character string into an input field in the window via the operation panel 522, and accepts a request of scrolling the displayed image through the scroll bars.

Furthermore, the main control unit 501 has an operation panel control function of determining whether the operation position on the operation panel 522 is in the overlap portion (display region) overlapping with the display panel 521 or the other peripheral portion that does not overlap with the display panel 521 (non-display region) and of controlling the sensing region of the control panel 522 and the display position of the software keys, through execution of the operation detection control.

The main control unit 501 can detect a gesture operation on the operation panel 522, and execute a preset function in response to the detected gesture operation. The gesture operation is not a conventional simple touch operation, but means drawing a trajectory by a finger or the like, simultaneously designating multiple positions, and drawing a trajectory from at least one of the multiple positions through combination of these operations.

The camera unit 541 is a digital camera that electronically takes an image using an image pickup element, such as a CMOS (Complementary Metal Oxide Semiconductor) or a CCD (Charge-Coupled Device). The camera unit 541 converts image data acquired by imaging into, for instance, compressed image data, such as JPEG (Joint Photographic coding Experts Group), records the data in the storing unit 550, and outputs the data via the external input and output unit 560 and the wireless communication unit 510, through control by the main control unit 501. In the smartphone 500 shown in FIG. 21, the camera unit 541 is mounted on the same surface as that of the display input unit 520, but the mount position of the camera unit 541 is not limited thereto, this unit may be mounted on the back of the display input unit 520, or multiple camera units 541 may be mounted. In the case where the multiple camera units 541 are mounted, a camera unit 541 used for imaging may be switched to solely take an image, or the multiple camera units 541 may be simultaneously used for taking images.

The camera unit 541 can be used for various functions of the smartphone 500. For instance, this unit can display an image acquired by the camera unit 541 on the display panel 521, and use an image from the camera unit 541 as one of input operations on the operation panel 522. When the GPS receiving unit 570 detects the position, the image from the camera unit 541 may be referred to and the position may be detected. Furthermore, the image from the camera unit 541 may be referred to, and the optical axis direction of the camera unit 541 of the smartphone 500 may be determined without use of a three-axis acceleration sensor or together with use of the three-axis acceleration sensor, and the current usage environment may be determined. It is a matter of course that the image from the camera unit 541 may be used in the application software.

The main control unit 501 has functions, such as the aforementioned CPU 40 in FIG. 1, the smoothing device 114, the noise extraction device 116, the noise addition device 118, and the image combining device 122 and the like in FIGS. 4, 10 and 16.

Furthermore, position information acquired from the GPS receiving unit 570, audio information acquired from the microphone 532 (audio-text conversion may be performed by the main control unit or the like and text information may be acquired) and attitude information and the like acquired by the motion sensor unit 580 may be added to still image or moving image data, and the data may be stored in the storing unit 550 and output via the external input and output unit 560 or the wireless communication unit 510.

It is a matter of course that the present invention is not limited to the examples described in the specification and the examples shown in the drawings, various design modification and improvement may be made in a scope without departing the gist of the present invention.

What is claimed is:

1. An image processing device, comprising:
    an image acquisition device acquiring a taken image in which a subject is imaged;
    a smoothing device generating a smoothed image by smoothing the taken image;
    a noise extraction device extracting a difference noise component from a difference between the taken image and the smoothed image;
    a noise addition device adding the difference noise component to the smoothed image;
    a map acquisition device acquiring a distance map that represents a distribution of distances on a pixel-by-pixel basis or a region-by-region basis in the taken image; and
    an image combining device combining the taken image with the smoothed image on the basis of the distance map, and generating an output image.

2. An imaging device, comprising the image processing device according to claim 1.

3. An image processing method, comprising:
    a step, executed by a processor, of acquiring a taken image in which a subject is imaged,
    a step, executed by the processor, of generating a smoothed image by smoothing the taken image;
    a step, executed by the processor, of acquiring a noise image that represents noise included in the taken image;
    a step, executed by the processor, of generating a smoothed noise image by smoothing the noise image with the smoothing strength used for smoothing the taken image;
    a step, executed by the processor, of extracting a difference noise component from a difference between the noise image and the smoothed noise image;
    a step, executed by the processor, of adding the difference noise component to the smoothed image;
    a step, executed by the processor, of acquiring a distance map that represents a distribution of distances on a pixel-by-pixel basis or a region-by-region basis in the taken image; and
    a step, executed by the processor, of combining the taken image with the smoothed image on the basis of the distance map, and generating an output image.

4. A non-transitory computer-readable medium storing a program causing the processor to execute the image processing method according to claim 3.

* * * * *